US011888204B2

(12) United States Patent
Acar et al.

(10) Patent No.: US 11,888,204 B2
(45) Date of Patent: Jan. 30, 2024

(54) LOW LOSS TRANSMISSION LINE COMPRISING A SIGNAL CONDUCTOR AND RETURN CONDUCTORS HAVING CORRESPONDING CURVED ARRANGEMENTS

(71) Applicant: NXP B.V., Eindhoven (NL)

(72) Inventors: Mustafa Acar, Eindhoven (NL); Danny Wayling Chang, Utrecht (NL); Dominicus Martinus Wilhelmus Leenaerts, Riethoven (NL); Philipp Franz Freidl, Weurt (NL)

(73) Assignee: NXP B.V., Eindhoven (NL)

( * ) Notice: Subject to any disclaimer, the term of this patent is extended or adjusted under 35 U.S.C. 154(b) by 11 days.

(21) Appl. No.: 17/662,572

(22) Filed: May 9, 2022

(65) Prior Publication Data

US 2023/0361443 A1 Nov. 9, 2023

(51) Int. Cl.
*H01P 3/00* (2006.01)
*H01P 1/02* (2006.01)
*H01P 3/02* (2006.01)

(52) U.S. Cl.
CPC .............. *H01P 3/006* (2013.01); *H01P 1/022* (2013.01); *H01P 3/003* (2013.01); *H01P 3/026* (2013.01)

(58) Field of Classification Search
CPC ................................. H01P 3/006; H01P 3/003
USPC .......................................................... 333/238
See application file for complete search history.

(56) References Cited

U.S. PATENT DOCUMENTS 7,626,476 B2 * 12/2009 Kim et al. .............. H01P 3/003 333/33
8,058,953 B2 * 11/2011 Cho ........................ H01P 3/003 257/664
2005/0139390 A1 6/2005 Kim et al.
2006/0270210 A1 * 11/2006 Pruvost et al. ......... H01P 3/084 257/773
2007/0241844 A1 10/2007 Kim et al.
2009/0255720 A1 10/2009 Lu et al.

(Continued)

FOREIGN PATENT DOCUMENTS

CN 106783812 A 5/2017
WO WO-2018236541 A1 12/2018

OTHER PUBLICATIONS

Jaewon Kim et al. "Novel CMOS Low-loss Transmission Line Structure". T4A.3. 2004 IEEE Xplore. 4 pages.

(Continued)

*Primary Examiner* — Benny T Lee

(57) ABSTRACT

A transmission line includes a signal conductor and one or more return conductors, one or more of which having a stepped multi-layer structure. The return conductors may be disposed at opposite sides of the signal conductor. The return conductors may be multi-layer structures. At least some layers of each return conductor may have a stepped arrangement that defines a curve, such as an exponential curve. Additionally or alternatively, the signal conductor may be a stepped multi-layer structure, where at least some layers of the signal conductor may define a curve, such as an exponential curve. The signal conductor may be disposed at one or more upper layers of the transmission line or may be embedded at one or more layers near the center of the transmission line.

14 Claims, 13 Drawing Sheets

(56) References Cited

U.S. PATENT DOCUMENTS

2018/0196192 A1 7/2018 Hu et al.

OTHER PUBLICATIONS

Jun-De Jin et al. "Loss Single and Differential Semi-Coaxial Interconnects in Standard CMOS Process". 2006 IEEE Xplore, 4 pagesin Standard CMOS Process. 2006 IEEE Xplore.

* cited by examiner

LOW LOSS TRANSMISSION LINE COMPRISING A SIGNAL CONDUCTOR AND RETURN CONDUCTORS HAVING CORRESPONDING CURVED ARRANGEMENTS

TECHNICAL FIELD

Embodiments of the subject matter described herein relate generally to transmission lines, and more particularly to coplanar waveguides with stepped multi-layer conductors.

BACKGROUND

Classically sized coplanar waveguides (CPWs) used as in chip routing or power splitters include a central signal conductor and outer conductors (i.e., "return conductors" or "return path conductors") disposed at either side of the signal conductor. Conventionally, such outer conductors are single-layer structures disposed only in the same layer as the signal conductor, such that the outer conductors are "coplanar" with the signal conductor. Insertion loss attributable to such conventional CPWs becomes more impactful at higher frequencies and larger chip sizes.

SUMMARY

A brief summary of various exemplary embodiments is presented below. Some simplifications and omissions may be made in the following summary, which is intended to highlight and introduce some aspects of the various exemplary embodiments, without limiting the scope. Detailed descriptions of an exemplary embodiment adequate to allow those of ordinary skill in the art to make and use these concepts will follow in later sections.

In an example embodiment, a waveguide includes a first return conductor having a first plurality of conductive layers, a second return conductor having a second plurality of conductive layers, and a signal conductor disposed between the first return conductor and the second return conductor. At least one of the first plurality of conductive layers, the second plurality of conductive layers, or the signal conductor may have a stepped arrangement.

In one or more embodiments, the first plurality of conductive layers of the first return conductor has a first stepped arrangement that defines a first curve and the second plurality of conductive layers of the second return conductor has a second stepped arrangement that defines a second curve.

In one or more embodiments, the first curve and the second curve are each selected from the group consisting of: an exponential curve, a geometric curve, and a parabolic curve.

In one or more embodiments, the signal conductor includes a third plurality of conductive layers having a third stepped arrangement that defines a third curve and a fourth curve.

In one or more embodiments, the third curve and the second curve are each selected from the group consisting of: an exponential curve, a geometric curve, and a parabolic curve.

In one or more embodiments, each of the third plurality of conductive layers of the signal conductor is disposed in a respective intermediate dielectric layer of the waveguide.

In one or more embodiments, at least one conductive layer of the third plurality of conductive layers of the signal conductor is disposed at an upper surface of the waveguide.

In one or more embodiments, the first plurality of conductive layers of the first return conductor and the second plurality of conductive layers of the second return conductor are each substantially vertically aligned, the signal conductor includes a third plurality of conductive layers, and the conductive layers of the third plurality of conductive layers have increasing widths with increasing proximity to an upper surface of the waveguide.

In one or more embodiments, the waveguide includes a reference plane coupled to the first return conductor and the second return conductor. The reference plane may include periodic openings that are overlapped by the signal conductor.

In an example embodiment, a coplanar waveguide includes a first return conductor having a first plurality of stepped conductive layers, a second return conductor having a second plurality of stepped conductive layers, a reference plane coupled to the first return conductor and the second return conductor, and a signal conductor disposed between the first return conductor and the second return conductor.

In one or more embodiments, the first plurality of stepped conductive layers of the first return conductor includes a first set of stepped conductive layers having first edges that define a first curve and a second set of stepped conductive layers having second edges that define a second curve. The second plurality of stepped conductive layers of the second return conductor may include a third set of stepped conductive layers having third edges that define a third curve and a fourth set of stepped conductive layers having fourth edges that define a fourth curve. The first edges, the second edges, the third edges, and the fourth edges may be capacitively coupled with the signal conductor.

In one or more embodiments, the signal conductor is disposed in at least one intermediate dielectric layer of the coplanar waveguide.

In one or more embodiments, the signal conductor includes at least one conductive layer disposed at an upper surface of the coplanar waveguide.

In one or more embodiments, the signal conductor includes a third plurality of stepped conductive layers.

In one or more embodiments, each conductive layer of the first plurality of stepped conductive layers and the second plurality of stepped conductive layers extends closer to a central axis of the coplanar waveguide with increasing proximity to the reference plane.

In an example embodiment, a transmission line includes a first return conductor having a first plurality of stepped conductive layers defining a first curve, a second return conductor having a second plurality of stepped conductive layers defining a second curve, and a signal conductor disposed between the first return conductor and the second return conductor. The first curve and the second curve may be selected from the group consisting of: an exponential curve, a geometric curve, and a parabolic curve.

In one or more embodiments, the signal conductor is disposed in at least one intermediate dielectric layer of the transmission line.

In one or more embodiments, the signal conductor includes at least one conductive layer disposed at an upper surface of the transmission line.

In one or more embodiments, the signal conductor includes a third plurality of stepped conductive layers including a first conductive layer. The conductive layers of the third plurality of stepped conductive layers may have decreasing width with increasing distance from the first conductive layer.

In one or more embodiments, each conductive layer of the first plurality of stepped conductive layers and the second plurality of stepped conductive layers extends closer to a central axis of the transmission line with increasing proximity to a reference plane of the coplanar waveguide.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
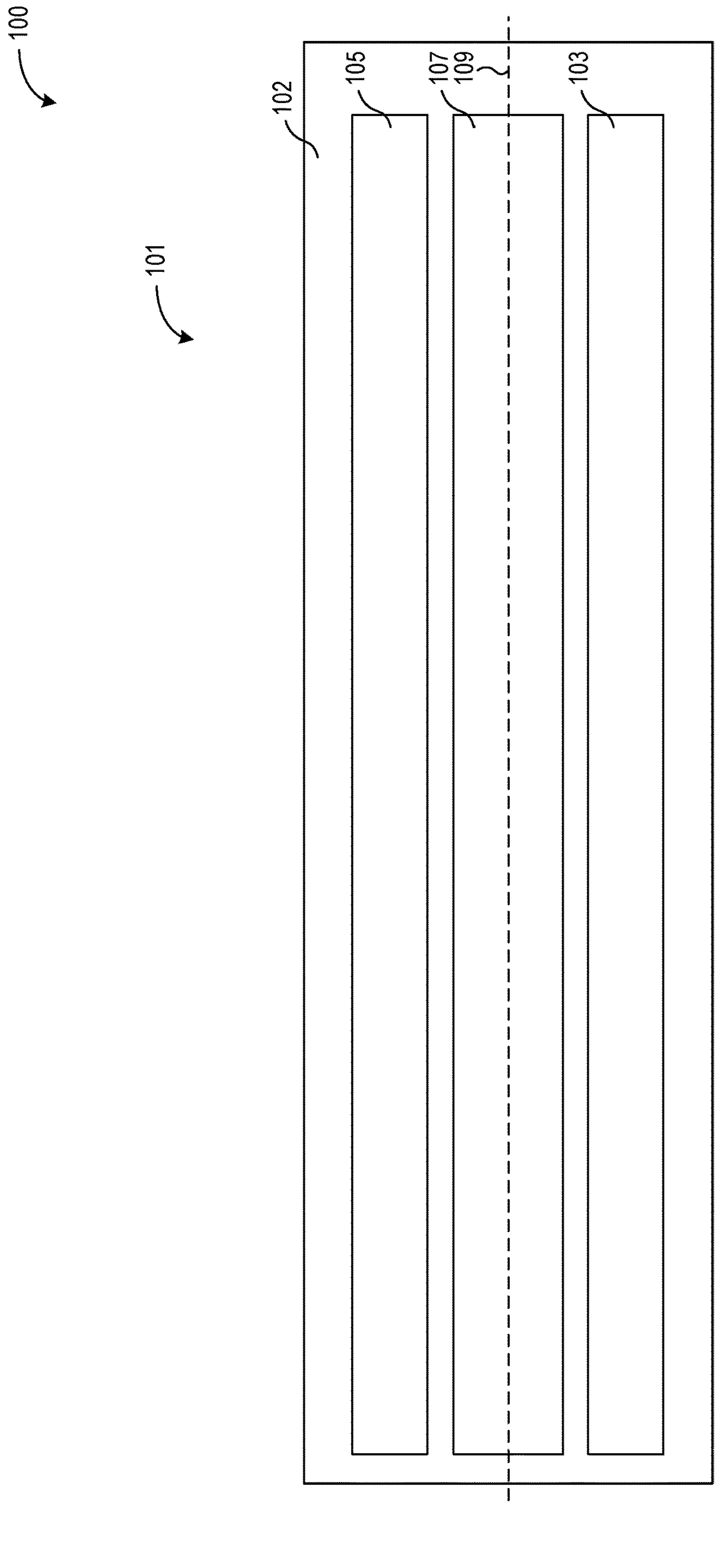
FIG. 1 is a top view of a straight coplanar waveguide that includes one or more stepped structures, in accordance with various embodiments.

Various embodiments described herein address the above challenges by providing coplanar waveguide transmission lines (sometimes referred to as "coplanar waveguides") having one or more stepped multi-layer structures (e.g., a stepped signal conductor, stepped return conductors, or both). Herein, the term "coplanar waveguide" or "coplanar waveguide transmission line" refers to any transmission line having a central signal conductor and two return conductors disposed at opposite sides of the signal conductor, where one or more layers of the central signal conductor are in the same plane (e.g., same layer) as one or more layers of each of the return conductors.

Conventionally, a coplanar waveguide formed on a substrate includes a single-layer central signal conductor and two single-layer return conductors disposed at opposite sides of the signal conductor, such that the signal conductor is capacitively coupled to the return conductors. Such conventional coplanar waveguides become significantly lossy at higher frequencies (e.g., above around 10 GHz), where such loss is at least partially attributable to parasitic coupling between the signal conductor and the substrate and skin effect losses caused by current crowding. Embodiments described herein provide a coplanar waveguide that includes multi-layer return conductors that are coupled to a reference plane (e.g., such that the return conductors are biased to a reference voltage), which may provide better isolation for the signal conductor, thereby reducing parasitic coupling between the signal conductor and the substrate. In some embodiments, the coplanar waveguide includes stepped multi-layer return conductors and/or a stepped multi-layer signal conductor, which broadens the surface area along which current flows through the signal conductor. For example, in a conventional coplanar waveguide, capacitive coupling occurs primarily between the signal conductor and portions of the return conductors that are in the same plane (i.e., same layer) as the signal conductor, which causes current crowding at the sides of the signal conductor due to the skin effect. Such current crowding increases signal losses in the conventional coplanar waveguide. Comparatively, various embodiments of the coplanar waveguide described herein have more distributed capacitive coupling (e.g., distributed more evenly over a larger surface area of the signal conductor) between the signal conductor and the return conductors due to the stepped arrangement of the signal conductor and/or the return conductors. This distributed capacitive coupling between the signal conductor and the return conductors may cause current that would otherwise be concentrated at side surfaces of the signal conductor to instead be spread across other surfaces (e.g., the upper surface, the lower surface, or both) of the signal conductor in addition to the side surfaces. This may desirably reduce current crowding and associated skin effect losses in the signal conductor.

In some embodiments, the coplanar waveguide includes a single-layer signal conductor and two stepped multi-layer return conductors. The single-layer signal conductor may be formed in the same layer of the coplanar waveguide as upper-most conductive layers of the return conductors. For example, the conductive layers of each return conductor may be stepped such that portions (e.g., edges) of the conductive layers closest to the signal conductor define a curve. These portions of the conductive layers may be capacitively coupled with the signal conductor. Each curve defined by the conductive layers of each return conductor may be an exponential curve, parabolic curve, geometric curve, or another type of curve, according to various embodiments. For example, conductive layers that are further away from an upper surface of the coplanar waveguide may extend closer to the center of the coplanar waveguide than conductive layers that closer to the upper surface. In some embodiments, only a subset of the conductive layers of each of the return conductors have such a stepped arrangement. In other embodiments, all of the conductive layers of each of the return conductors have the stepped arrangement.

In some embodiments, the coplanar waveguide includes a stepped multi-layer signal conductor, where conductive layers of the signal conductor have greater width the closer each layer is to the upper surface of the coplanar waveguide. Portions (e.g., edges) of the signal conductor may define first and second curves at opposite sides of the signal conductor. These portions of the conductive layers may be capacitively coupled with the signal conductor. The first and second curves defined by the conductive layers of the signal conductor may be an exponential curve, parabolic curve, geometric curve, or another type of curve, according to various embodiments.

In some embodiments, each of the signal conductor and the return conductors may have stepped arrangements as described above. In some embodiments, the signal conductor is a multi-layer signal conductor having a stepped arrangement and the return conductors are substantially vertically aligned (e.g., not stepped).

In some embodiments, the signal conductor may be disposed in a middle layer (i.e., not the upper-most layer or the lower-most layer) of the coplanar waveguide. The signal conductor may be a single-layer signal conductor or a multi-layer signal conductor, according to various embodiments. Each return conductor may include a first subset of stepped conductive layers and a second subset of stepped conductive layers, where the first subset of stepped conductive layers define a first curve and the second subset of stepped conductive layers define a second curve. The first curve and second curve may define respective exponential, geometric, parabolic, or other types of curves, for example. The conductive layers of the first subset of stepped conductive layers may be arranged such that conductive layers with greater proximity to the upper surface of the coplanar waveguide extend closer to the center of the coplanar waveguide than conductive layers that are further away from the upper surface. The conductive layers of the second subset of stepped conductive layers may be arranged such that conductive layers that are located further away from the upper surface of the coplanar waveguide extend closer to the center of the coplanar waveguide than conductive layers that are disposed closer to the upper surface.

In some embodiments, the reference-plane is solid along the length of the coplanar waveguide. In other embodiments, the reference-plane includes periodic openings along the length of the coplanar waveguide. Such openings may be dimensioned such that portions (e.g., edges) of the reference-plane also define the curve defined by the portions of stepped conductive layers of the return conductors, for example. These portions of the conductive layers may be capacitively coupled with the signal conductor. Such openings may be completely or partially overlapped by the signal conductor of the coplanar waveguide.

FIG. 1 shows a top view 100 of a coplanar waveguide 101. The coplanar waveguide 101 includes dielectric material 102, return conductors 103 and 105, and a signal conductor 107. The return conductors 103 and 105 are respectively arranged at opposite sides of the signal conductor 107. The return conductors 103 and 105 may each include multiple conductive layers that are electrically coupled to a reference plane (e.g., a conductive layer that may be biased to a reference potential, such as a ground voltage) of the coplanar waveguide 101. The signal conductor 107 may include a single conductive layer or multiple conductive layers, according to various embodiments. The dielectric material 102 may include multiple layers of dielectric material in or on which the conductive layers of the return conductors 103 and 105 and the conductive layer(s) of the signal conductor 107 are formed. For example, the dielectric material 102 may include one or more dielectric (e.g., non-conductive) materials, such as silicon oxide, aluminum oxide, glass epoxy compounds (e.g., FR-4, CEM-1, CEM-2, CEM-3,), polytetrafluoroethylene (PTFE), polyimide, or other suitable dielectric materials.

In some embodiments, in each of the return conductors 103 and 105, the conductive layers are arranged in a stepped configuration in which at least a subset of the conductive layers extend toward a central axis 109 of the coplanar waveguide 101. In such embodiments, the return conductors 103 and 105 may be referred to as "stepped multi-layer return conductors". For example, stepped conductive layers of each of the return conductors 103 and 105 may extend closer to the central axis 109 as their distance from an upper surface of the coplanar waveguide 101 increases. As another example, each of the return conductors 103 and 105 may include a first subset of stepped conductive layers and a second subset of stepped conductive layers, with conductive layers of the first subset being disposed closer to the central axis 109 as distance from the upper surface of the coplanar waveguide 101 decreases and conductive layers of the second subset being disposed closer to the central axis 109 as distance from the upper surface increases. Portions of the conductive layers of the return conductors 103 and 105 may define one or more curves, such as exponential, geometric, parabolic, or other applicable types of curves.

In some embodiments in which the signal conductor 107 includes multiple conductive layers that are arranged in a stepped configuration by providing conductive layers having respectively different widths. In such embodiments, the signal conductor 107 may be referred to as a "stepped multi-layer signal conductor". For example, the width of each of the conductive layers of the signal conductor 107 (and, correspondingly, the extent to which each conductive layer extends away from the central axis 109) may decrease with increasing distance from an upper surface of the coplanar waveguide 101 (or with increasing distance from an upper-most conductive layer of the signal conductor 107). In such embodiments, portions (e.g., edges) of the conductive layers of the signal conductor 107 may define first and second curves (at opposite sides of the signal conductor 107), which may be exponential, geometric, parabolic, or other applicable types of curves. These portions of the conductive layers may be capacitively coupled with the signal conductor 107.

Figure 2:
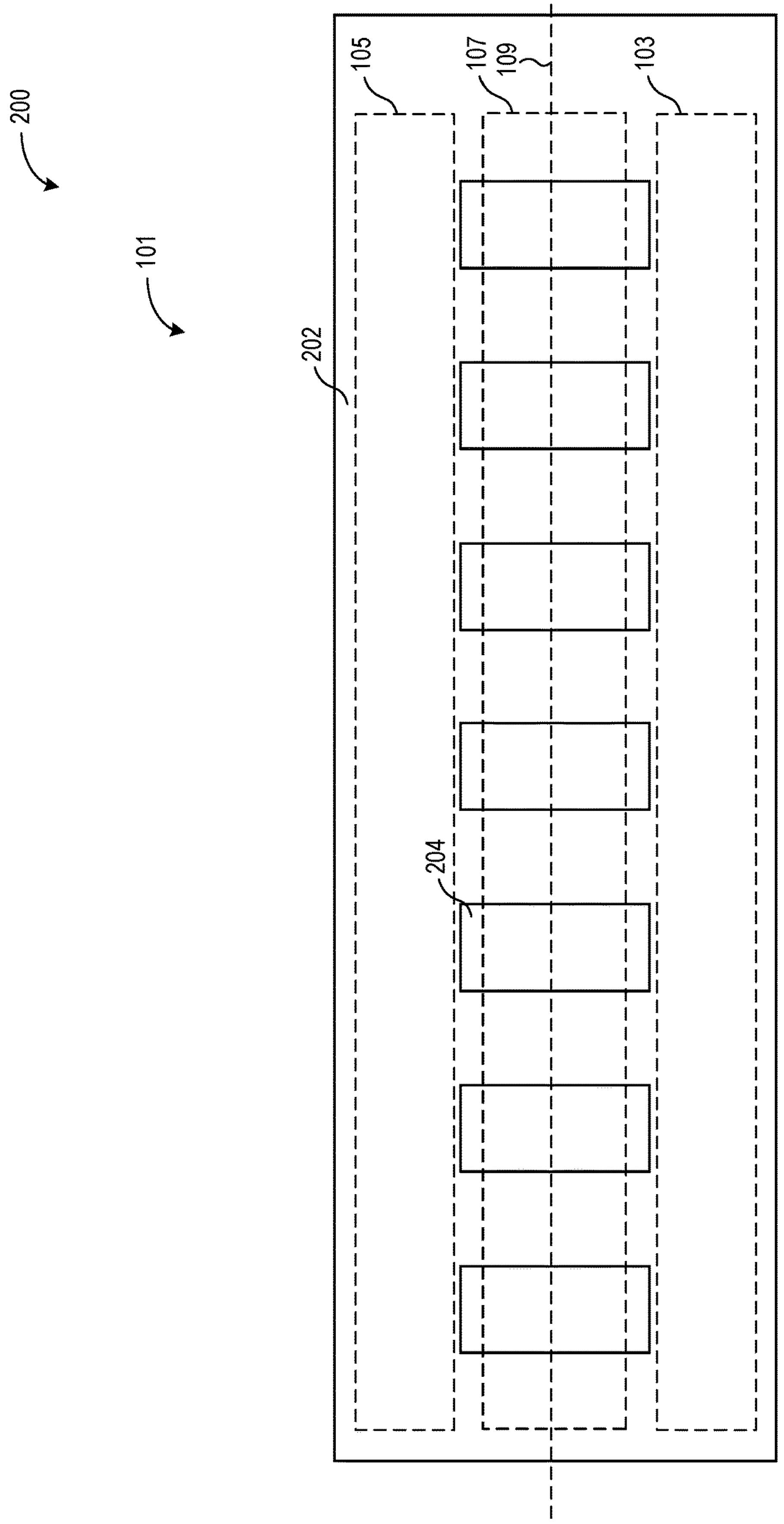
FIG. 2 is a bottom view of an embodiment of the coplanar waveguide of FIG. 1 showing periodic openings in a reference-plane of the coplanar waveguide, in accordance with various embodiments.

FIG. 2 shows a bottom view 200 (e.g., opposite the view 100 of FIG. 1) of an embodiment of the coplanar waveguide 101 having a reference plane 202 in which openings 204 are formed. Footprints of the return conductors 103, 105 and the signal conductor 107 are shown for reference.

The reference plane 202 may include at least one layer of conductive material formed at a back side (e.g., bottom side) of the coplanar waveguide 101. The conductive material may include copper or gold as non-limiting examples. As shown, the openings 204 may be disposed periodically in the reference plane 202 along the length of the coplanar waveguide 101. The openings 204 may be overlapped by portions of the signal conductor 107. In some embodiments, the openings 204 may be filled with dielectric (i.e., nonconductive) material (e.g., silicon oxide, aluminum oxide, air or other applicable dielectric materials). It should be understood that this example is illustrative and not limiting and that, in other embodiments, the reference plane 202 of the coplanar waveguide 101 may instead be a contiguous layer of conductive material (i.e., without openings) or may have openings with different shapes or arranged with different periodicity compared to the openings 204 shown.

Figure 3:
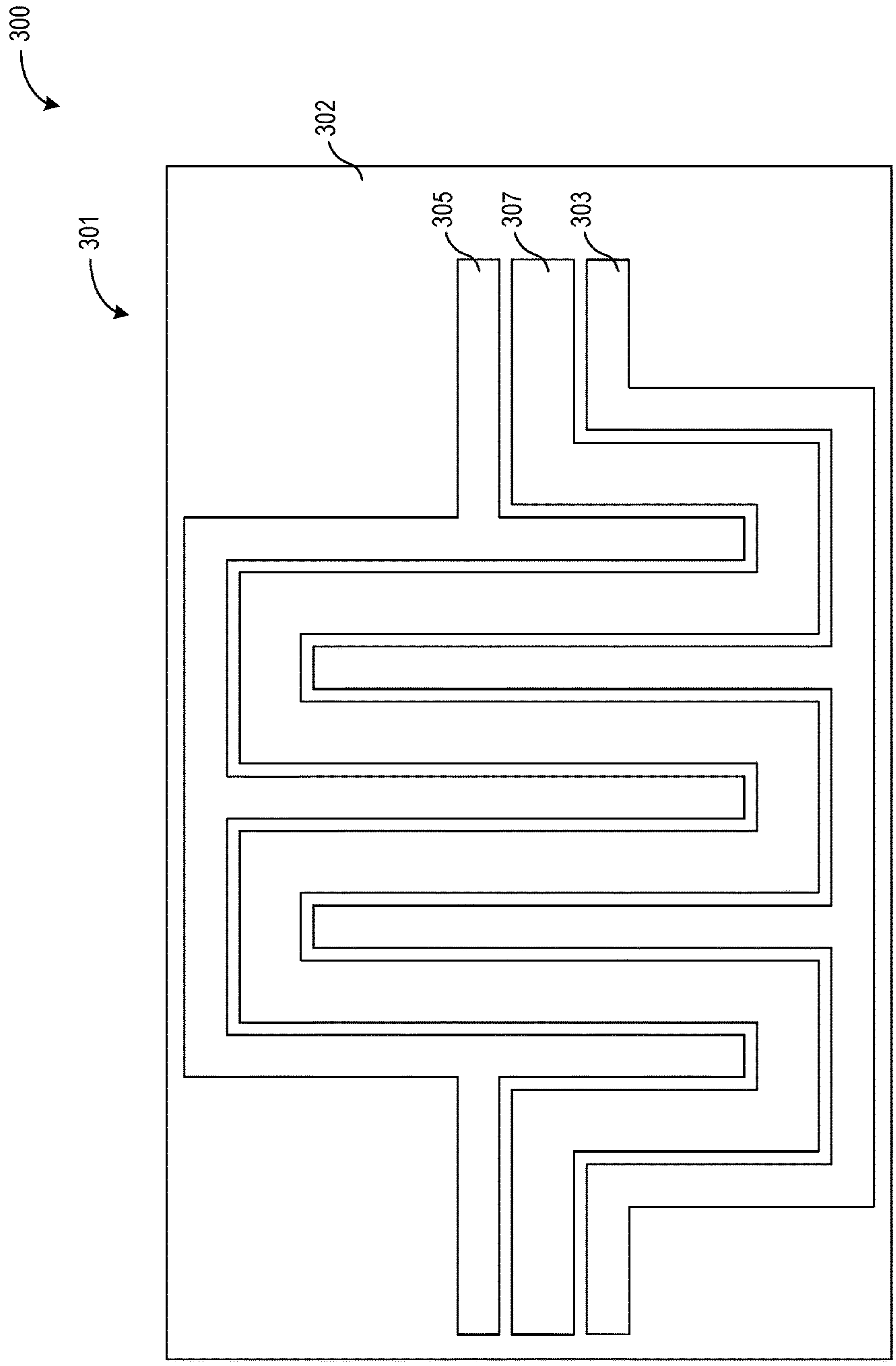
FIG. 3 is a top view of a meandered coplanar waveguide that includes one or more stepped structures, in accordance with various embodiments.

FIG. 3 shows a top view 300 of a coplanar waveguide 301 having a meandered arrangement. That is, the coplanar waveguide 301 may be a meandered coplanar waveguide. The coplanar waveguide 301 includes return conductors 303, 305 disposed at opposite sides of a signal conductor 307. The coplanar waveguide 301 may include a conductive reference plane (e.g., reference plane 202 of FIG. 2) formed at a bottom side of the coplanar waveguide 301. The return conductors 303, 305 and the signal conductor 307 may be formed in or on dielectric material 302. The dielectric material 302 may include multiple layers of dielectric material. Apart from the meandered arrangement of the coplanar waveguide 301, some aspects of the return conductors 303, 305, the signal conductor 307, the dielectric material 302, and/or other elements of the coplanar waveguide 301 (e.g., the reference plane) may be similar to those described above in connection with the coplanar waveguide 101 of FIGS. 1 and 2, and corresponding details are not repeated here for sake of brevity.

Figure 4:
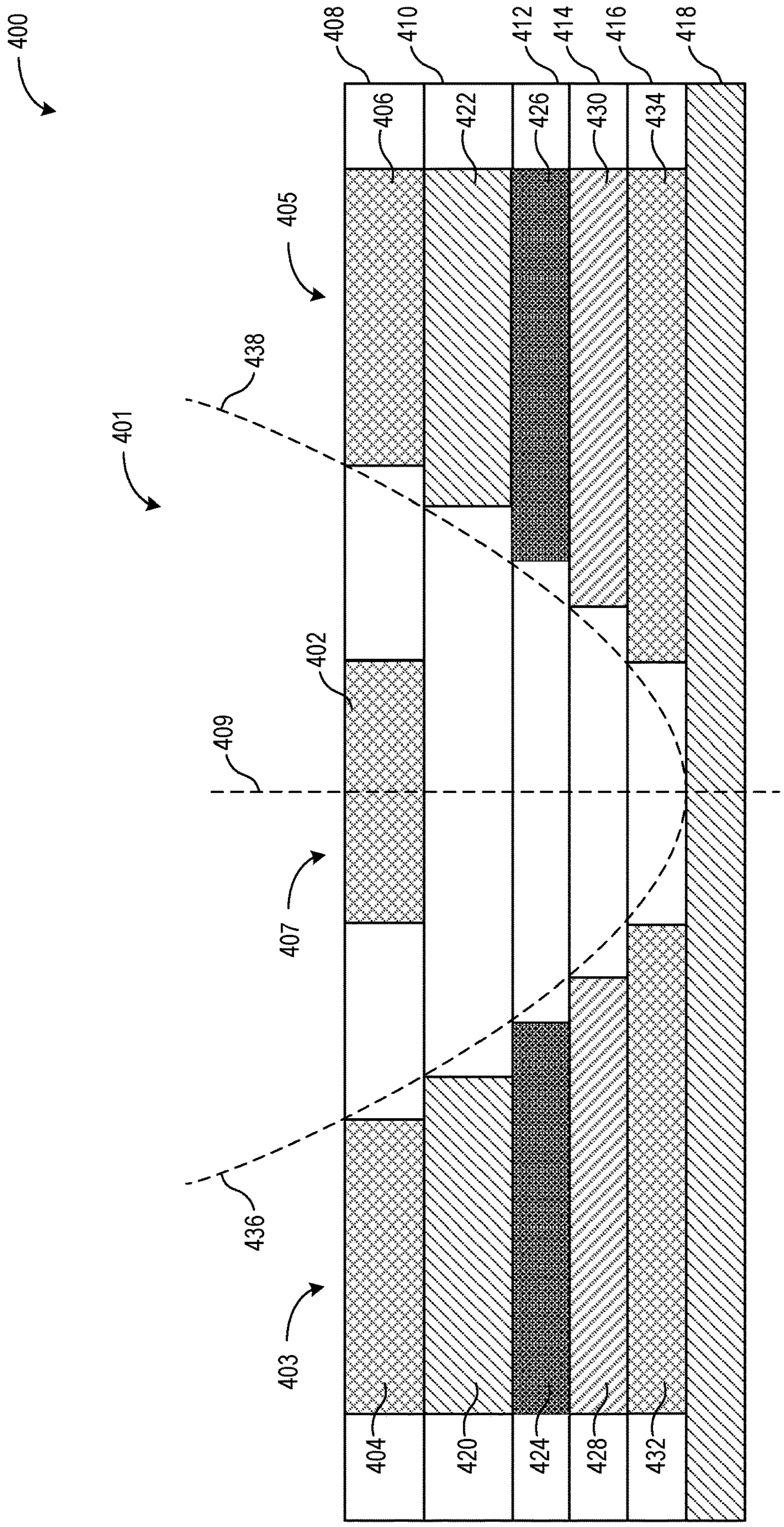
FIG. 4 is a cross-sectional view of a coplanar waveguide having a single-layer signal conductor and stepped multi-layer return conductors, in accordance with various embodiments.

FIG. 4 is a cross-sectional view 400 of a coplanar waveguide 401 (e.g., the coplanar waveguide 101, 301, FIGS. 1, 3, respectively) having a single-layer signal conductor 407 and stepped multi-layer return conductors 403 and 405. The coplanar waveguide 401 includes dielectric layers 408, 410, 412, 414, and 416 formed over a reference plane 418 and conductive layers 402, 404, 406, 420, 422, 424, 426, 428, 430, 432, and 434 are formed in or on corresponding dielectric layers of the dielectric layers 408, 410, 412, 414, and 416. The conductive layers 402, 404, 406, 420, 422, 424, 426, 428, 430, 432, and 434 and the reference plane 418 may be formed from one or more conductive materials such as gold or copper as non-limiting examples. While adjacent conductive layers of the conductive layers 402, 404, 406, 420, 422, 424, 426, 428, 430, 432, and 434 are shown to be formed directly on one another in the present example, it should be understood that one or more pairs of such adjacent conductive layers may be electrically connected by one or more conductive vias formed in corresponding dielectric layers of the dielectric layers 408, 410, 412, 414, and 416. The dielectric layers 408, 410, 412, 414, and 416 may be formed from one or more dielectric materials such as silicon oxide or aluminum oxide as non-limiting examples.

The signal conductor 407 includes a single conductive layer 402 disposed in or on the upper-most dielectric layer 408 of the coplanar waveguide 401 between the return conductors 403, 405. The return conductor 403 is a stepped multi-layer structure that includes conductive layers 404, 420, 424, 428, and 432. The return conductor 405 is a stepped multi-layer structure that includes conductive layers 406, 422, 426, 430, and 434. Both the conductive layers 404, 420, 424, 428, and 432 of the return conductor 403 and the conductive layers 406, 422, 426, 430, and 434 of the return conductor 405 are respectively stepped such that these layers extend closer to a central axis 409 the closer these conductive layers are to the reference plane 418 (in other words, the further these conductive layers are from the upper surface of the coplanar waveguide 401). Portions (e.g., edges) of the conductive layers of the return conductor 403 define a curve 436, which may be an exponential, geometric, or parabolic curve or another applicable type of curve. Portions (e.g., edges) of the conductive layers of the return conductor 405 define a curve 438, which may be an exponential, geometric, or parabolic curve or another applicable type of curve. These portions of the conductive layers of the return conductors 403 and 405 may be capacitively coupled with the signal conductor 407.

For example, with respect to the return conductor 403, the conductive layer 432 is closest to the reference plane 418 and furthest from the upper surface of the coplanar waveguide 401 and extends closest to the central axis 409. The conductive layer 428 is formed over the conductive layer 432 and is further from the central axis 409 than the conductive layer 432. The conductive layer 424 is formed over the conductive layer 428 and is further from the central axis 409 than the conductive layer 428. The conductive layer 420 is formed over the conductive layer 424 and is further from the central axis 409 than the conductive layer 424. The conductive layer 404 is formed over the conductive layer 420 and is further from the central axis 409 than the conductive layer 420.

For example, with respect to the return conductor 405, the conductive layer 434 is closest to the reference plane 418 and furthest from the upper surface of the coplanar waveguide 401 and extends closest to the central axis 409. The conductive layer 430 is formed over the conductive layer 434 and is further from the central axis 409 than the conductive layer 434. The conductive layer 426 is formed over the conductive layer 430 and is further from the central axis 409 than the conductive layer 430. The conductive layer 422 is formed over the conductive layer 426 and is further from the central axis 409 than the conductive layer 426. The conductive layer 406 is formed over the conductive layer 422 and is further from the central axis 409 than the conductive layer 422.

Because the conductive layers of the return conductors 403 and 405 have respectively stepped arrangements, capacitive coupling between the signal conductor 407 and each of the conductive layers of the return conductors 403 and 405, is more evenly distributed across the signal conductor 407, resulting in broader current distribution across the surfaces (e.g., both the side and bottom surfaces) of the signal conductor 407 during normal operation of the coplanar waveguide 401. Because the current distribution across the surfaces of the signal conductor 407 is more evenly distributed across a wider area, current crowding and associated skin effect losses in the signal conductor 407 are advantageously reduced. In some embodiments, the curves 436 and 438 may be defined by the return conductors 403 and 405, such that magnitudes of capacitive couplings between the signal conductor 407 and of the conductive layers of the return conductors 403 and 405 are all substantially equal (e.g., within around 10%).

Figure 5:
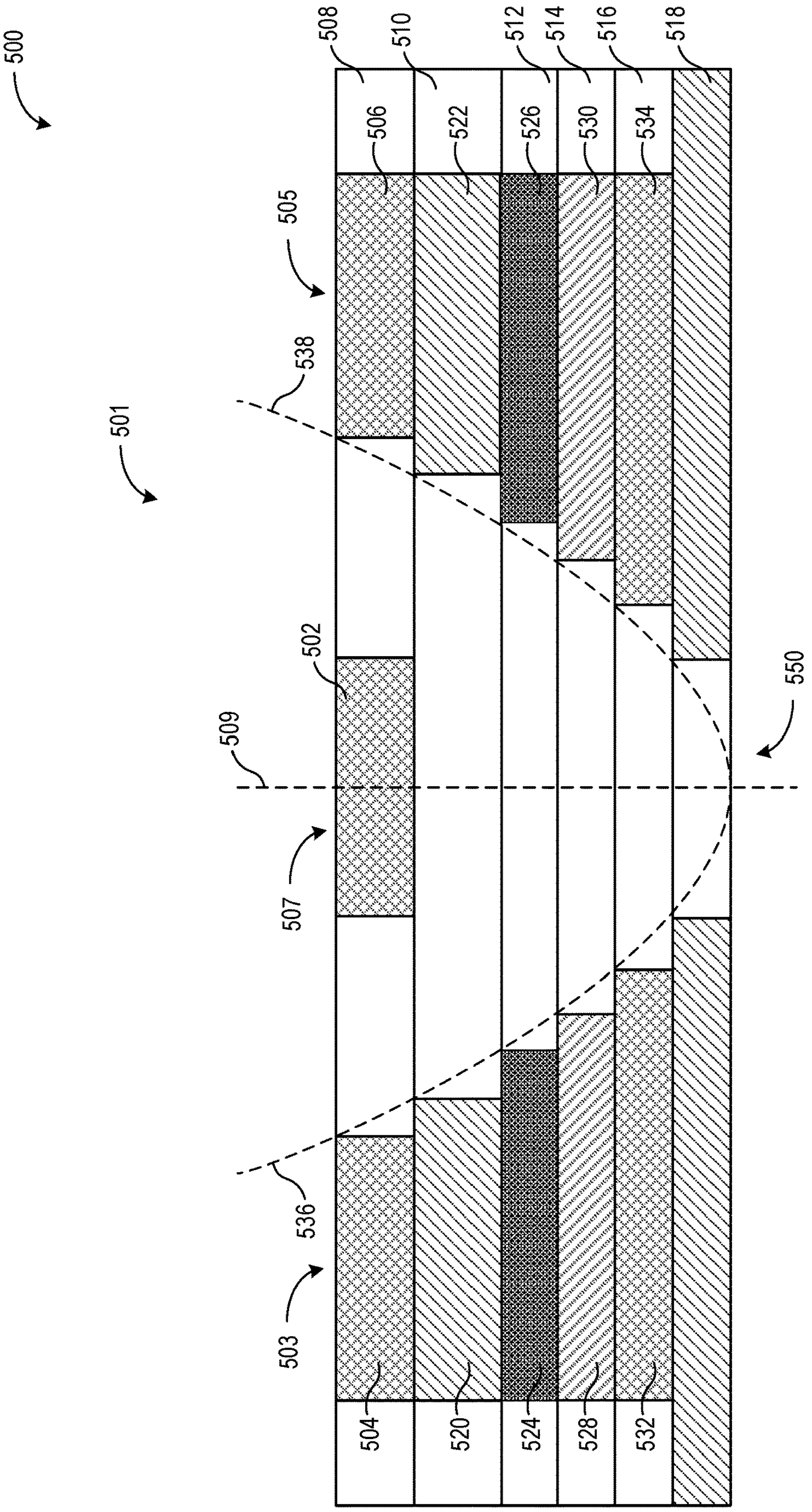
FIG. 5 is a cross-sectional view of a coplanar waveguide overlapping an opening in the reference-plane, the coplanar waveguide having a single-layer signal conductor and stepped multi-layer return conductors, in accordance with various embodiments.

FIG. 5 is a cross-sectional view 500 of a coplanar waveguide 501 (e.g., the coplanar waveguide 101, 301, FIGS. 1, 2, 3) having a single-layer signal conductor 507, stepped multi-layer return conductors 503 and 505, and a reference plane 518 having an opening 550 (e.g., the opening 204 of FIG. 2). The coplanar waveguide 501 includes dielectric layers 508, 510, 512, 514, and 516 formed over a reference plane 518 and conductive layers 502, 504, 506, 520, 522,

524, 526, 528, 530, 532, and 534 are formed in or on corresponding dielectric layers of the dielectric layers 508, 510, 512, 514, and 516. Some aspects of the return conductors 503, 505, the signal conductor 507, and/or other elements of the coplanar waveguide 501 may be similar to those described above in connection with the coplanar waveguide 401 of FIG. 4, and corresponding details are not repeated here for sake of brevity. In some embodiments, the coplanar waveguide 501 may have periodic openings 550 in the reference plane 518, such that cross-sections of the coplanar waveguide 501 overlapping the periodic openings 550 appear as shown in the present example, while cross-sections of the coplanar waveguide 501 that do not overlap the periodic openings 550 appear as shown in the example of FIG. 4 (i.e., where the reference plane 418 does not include an opening along the cross-section).

The signal conductor 507 includes a single conductive layer 502 disposed in or on the upper-most dielectric layer 508 of the coplanar waveguide 501 between the return conductors 503, 505. The return conductor 503 is a stepped multi-layer structure that includes conductive layers 504, 520, 524, 528, and 532. The return conductor 505 is a stepped multi-layer structure that includes conductive layers 506, 522, 526, 530, and 534. Both the conductive layers 504, 520, 524, 528, and 532 of the return conductor 503 and the conductive layers 506, 522, 526, 530, and 534 of the return conductor 505 are respectively stepped such that these layers extend closer to a central axis 509 the closer these conductive layers are to the reference plane 518 (in other words, the further these conductive layers are from the upper surface of the coplanar waveguide 501). Portions (e.g., edges) of the return conductor 503 in combination with a portion (e.g., edge) of the reference plane 518 in the opening 550 define a curve 536, which may be an exponential, geometric, or parabolic curve or another applicable type of curve. Portions (e.g., edges) of the return conductor 505 in combination with a portion (e.g., edge) of the reference plane 518 in the opening 550 define a curve 538, which may be an exponential, geometric, or parabolic curve or another applicable type of curve. These portions of the conductive layers of the return conductors 503 and 505 may be capacitively coupled with the signal conductor 507.

Figure 6:
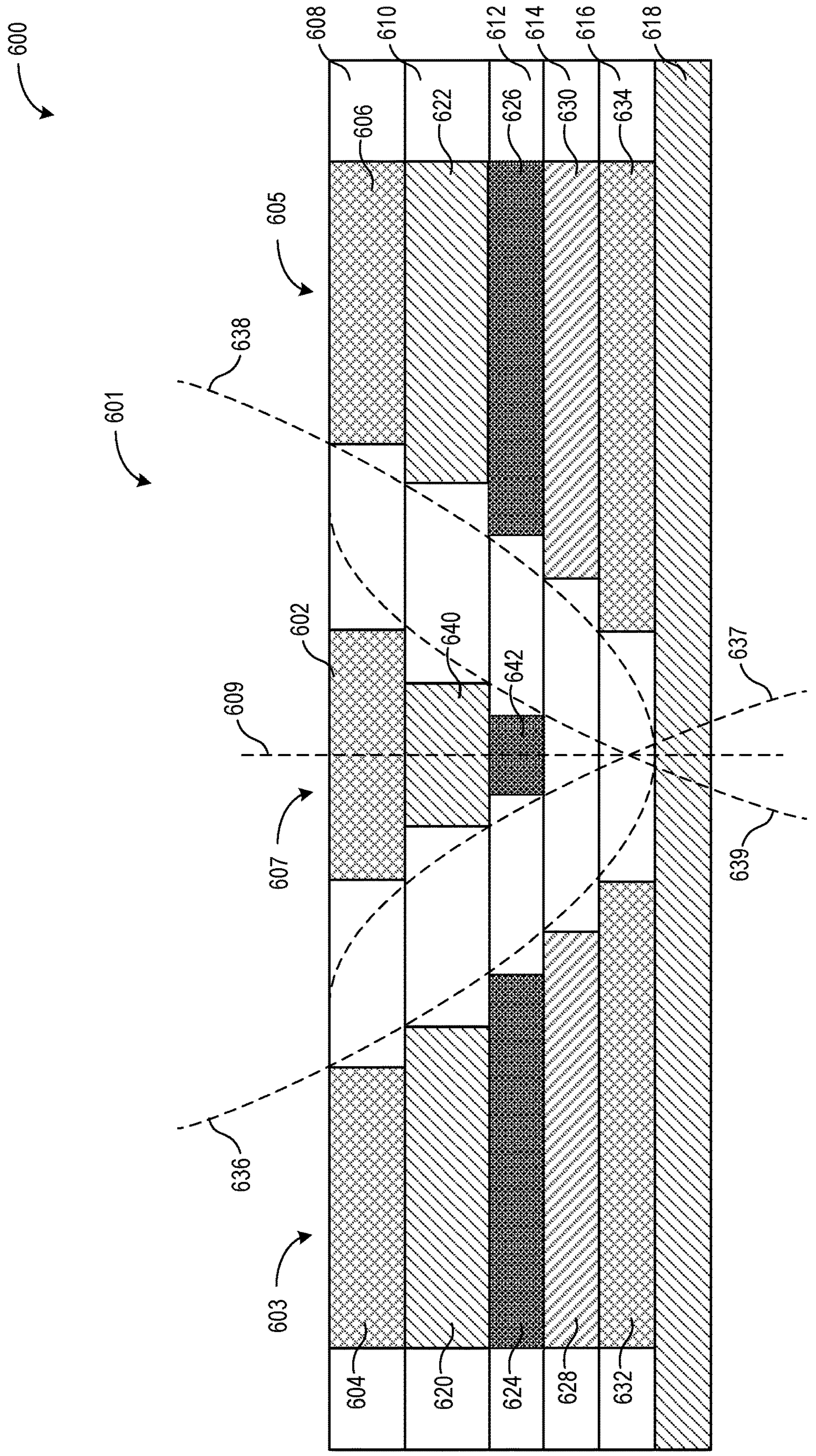
FIG. 6 is a cross-sectional view of a coplanar waveguide having a stepped multi-layer signal conductor and stepped multi-layer return conductors, in accordance with various embodiments.

FIG. 6 is a cross-sectional view 600 of a coplanar waveguide 601 (e.g., the coplanar waveguide 101, 301, FIGS. 1, 3, respectively) having a stepped multi-layer signal conductor 607 and stepped multi-layer return conductors 603 and 605. The coplanar waveguide 601 includes dielectric layers 608, 610, 612, 614, and 616 formed over a reference plane 618 and conductive layers 602, 604, 606, 620, 622, 624, 626, 628, 630, 632, 634, 640, and 642 are formed in or on corresponding dielectric layers of the dielectric layers 608, 610, 612, 614, and 616. The conductive layers 602, 604, 606, 620, 622, 624, 626, 628, 630, 632, 634, 640, and 642 and the reference plane 618 may be formed from one or more conductive materials such as gold or copper as non-limiting examples. While adjacent conductive layers of the conductive layers 602, 604, 606, 620, 622, 624, 626, 628, 630, 632, 634, 640, and 642 are shown to be formed directly on one another in the present example, it should be understood that one or more pairs of such adjacent conductive layers may be electrically connected by one or more conductive vias formed in corresponding dielectric layers of the dielectric layers 608, 610, 612, 614, and 616. The dielectric layers 608, 610, 612, 614, and 616 may be formed from one or more dielectric materials such as silicon oxide or aluminum oxide as non-limiting examples.

The signal conductor 607 is a stepped multi-layer structure that includes conductive layers 602, 640, and 642 disposed in or on the dielectric layers 608, 610, and 612, respectively, of the coplanar waveguide 601 between the return conductors 603, 605. The conductive layers 602, 640, and 642 are stepped such that the conductive layers decrease in width the further away these conductive layers are from the upper surface of the coplanar waveguide 601 and the conductive layer 602. For example, the conductive layer 602 is formed in or on the dielectric layer 608 (closest to the upper surface of the coplanar waveguide 601) over the conductive layer 640 and has a greater width than the conductive layer 640. The conductive layer 640 is formed in or on the dielectric layer 610 over the conductive layer 642 and has a greater width than the conductive layer 642. The conductive layer 642 is formed in or on the dielectric layer 612 below the conductive layers 602 and 640 (furthest from the upper surface of the coplanar waveguide 601) and has a shorter width than both the conductive layer 602 and the conductive layer 640. Portions (e.g., edges) of the conductive layers of the signal conductor 607 at a first side (e.g., the left side, in the view 600) of the signal conductor 607 define a curve 637, which may be an exponential, geometric, or parabolic curve or another applicable type of curve. Portions (e.g., edges) of the conductive layers of the signal conductor 607 at a second side (e.g., the right side, in the view 600) of the signal conductor 607 define a curve 639, which may be an exponential, geometric, or parabolic curve or another applicable type of curve.

The return conductor 603 is a stepped multi-layer structure that includes conductive layers 604, 620, 624, 628, and 632. The return conductor 605 is a stepped multi-layer structure that includes conductive layers 606, 622, 626, 630, and 634. The conductive layers 604, 620, 624, 628, and 632 of the return conductor 603 and the conductive layers 606, 622, 626, 630, and 634 of the return conductor 605 are respectively stepped such that these layers extend closer to a central axis 609 the closer these conductive layers are to the reference plane 618 (in other words, the further these conductive layers are from the upper surface of the coplanar waveguide 601). Portions (e.g., edges) of the conductive layers of the return conductor 603 define a curve 636, which may be an exponential, geometric, or parabolic curve or another applicable type of curve. Portions (e.g., edges) of the conductive layers of the return conductor 605 define a curve 638, which may be an exponential, geometric, or parabolic curve or another applicable type of curve. These portions of the conductive layers of the return conductors 603 and 605 may be capacitively coupled with the signal conductor 607.

For example, with respect to the return conductor 603, the conductive layer 632 is closest to the reference plane 618 and furthest from the upper surface of the coplanar waveguide 601 and extends closest to the central axis 609. The conductive layer 628 is formed over the conductive layer 632 and is further from the central axis 609 than the conductive layer 632. The conductive layer 624 is formed over the conductive layer 628 and is further from the central axis 609 than the conductive layer 628. The conductive layer 620 is formed over the conductive layer 624 and is further from the central axis 609 than the conductive layer 624. The conductive layer 604 is formed over the conductive layer 620 and is further from the central axis 609 than the conductive layer 620.

For example, with respect to the return conductor 605, the conductive layer 634 is closest to the reference plane 618 and furthest from the upper surface of the coplanar waveguide 601 and extends closest to the central axis 609. The conductive layer 630 is formed over the conductive layer 634 and is further from the central axis 609 than the conductive layer 634. The conductive layer 626 is formed over the conductive layer 630 and is further from the central axis 609 than the conductive layer 630. The conductive layer 622 is formed over the conductive layer 626 and is further from the central axis 609 than the conductive layer 626. The conductive layer 606 is formed over the conductive layer 622 and is further from the central axis 609 than the conductive layer 622.

Because the conductive layers of the return conductors 603 and 605 and the conductive layers of the signal conductor 607 have respectively stepped arrangements, capacitive coupling between the signal conductor 607 and each of the conductive layers of the return conductors 603 and 605, is more evenly distributed across the signal conductor 607, resulting in broader current distribution across the surfaces (e.g., both the side and bottom surfaces) of the signal conductor 607 during normal operation of the coplanar waveguide 601. Because the current distribution across the surfaces of the signal conductor 607 is more evenly distributed across a wider area, current crowding and associated skin effect losses in the signal conductor 607 are advantageously reduced. In some embodiments, the curves 636 and 638 may be defined by the return conductors 603 and 605, such that magnitudes of capacitive couplings between the signal conductor 607 and of the conductive layers of the return conductors 603 and 605 are all substantially equal (e.g., within around 10%). Further, because it includes multiple conductive layers, rather than a single conductive layer, the signal conductor 607 may have comparatively lower ohmic resistance and, therefore, less signal loss.

Figure 7:
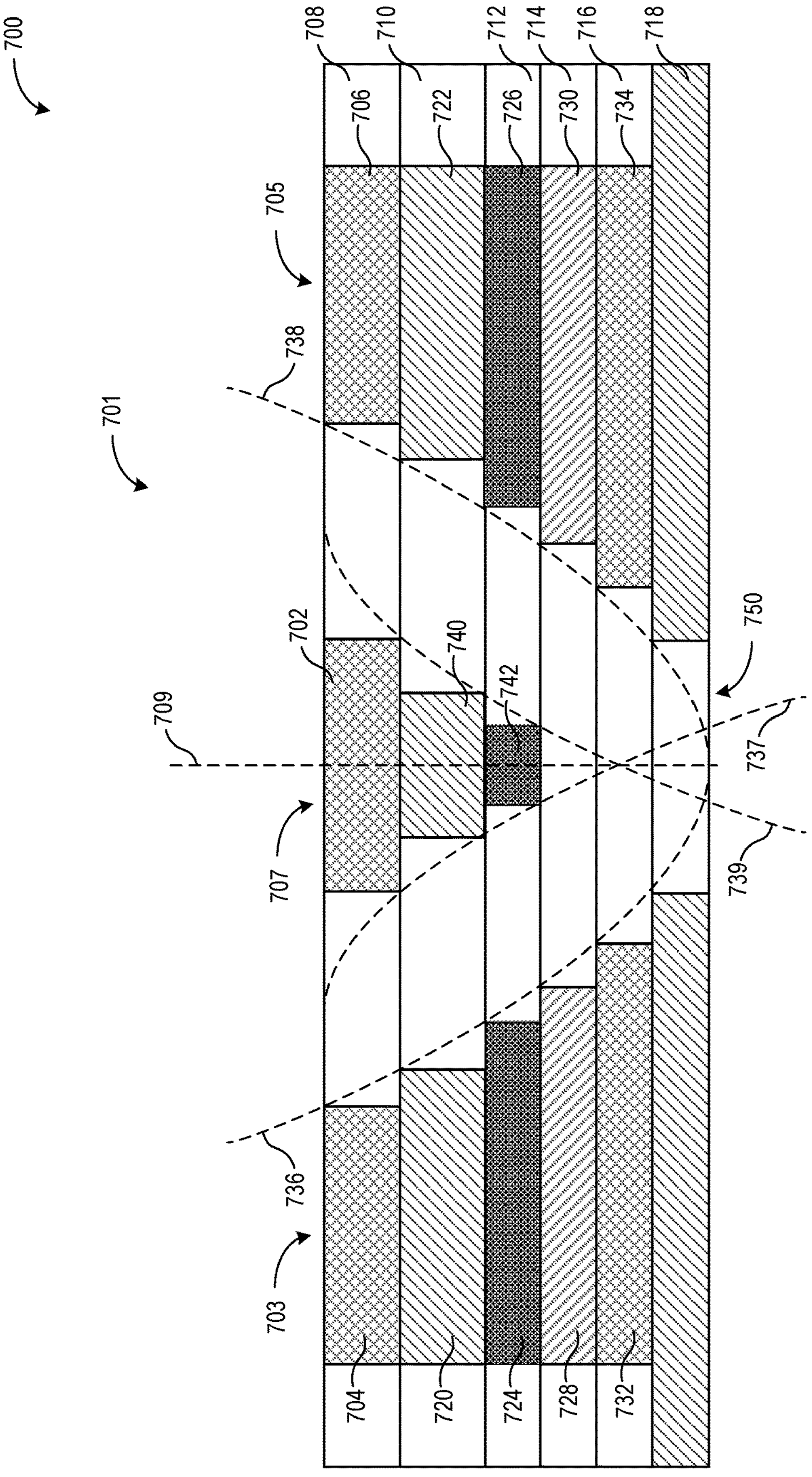
FIG. 7 is a cross-sectional view of a coplanar waveguide overlapping an opening in the reference-plane, the coplanar waveguide having a stepped multi-layer signal conductor and stepped multi-layer return conductors, in accordance with various embodiments.

FIG. 7 is a cross-sectional view 700 of a coplanar waveguide 701 (e.g., the coplanar waveguide 101, 301, FIGS. 1, 2, 3) having a stepped multi-layer signal conductor 707, stepped multi-layer return conductors 703 and 705, and a reference plane 718 having an opening 750 (e.g., the opening 204 of FIG. 2). The coplanar waveguide 701 includes dielectric layers 708, 710, 712, 714, and 716 formed over a reference plane 718 and conductive layers 702, 704, 706, 720, 722, 724, 726, 728, 730, 732, 734, 740, and 742 are formed in or on corresponding dielectric layers of the dielectric layers 708, 710, 712, 714, and 716. Some aspects of the return conductors 703, 705, the signal conductor 707, and/or other elements of the coplanar waveguide 701 may be similar to those described above in connection with the coplanar waveguide 601 of FIG. 6 and corresponding details are not repeated here for sake of brevity. In some embodiments, the coplanar waveguide 701 may have periodic openings 750 in the reference plane 718, such that cross-sections of the coplanar waveguide 701 overlapping the periodic openings 750 appear as shown in the present example, while cross-sections of the coplanar waveguide 701 that do not overlap the periodic openings 750 appear as shown in the example of FIG. 6 (i.e., where the reference plane 618 does not include an opening along the cross-section).

The signal conductor 707 is a stepped multi-layer structure that includes conductive layers 702, 740, and 742 disposed in or on the dielectric layers 708, 710, and 712, respectively, of the coplanar waveguide 701 between the return conductors 703, 705. The conductive layers 702, 740, and 742 are stepped such that the conductive layers decrease in width the further away these conductive layers are from the upper surface of the coplanar waveguide 701 and the conductive layer 702. For example, the conductive layer 702 is formed in or on the dielectric layer 708 (closest to the upper surface of the coplanar waveguide 701) over the conductive layer 740 and has a greater width than the conductive layer 740. The conductive layer 740 is formed in or on the dielectric layer 710 over the conductive layer 742 and has a greater width than the conductive layer 742. The conductive layer 742 is formed in or on the dielectric layer 712 below the conductive layers 702 and 740 (furthest from the upper surface of the coplanar waveguide 701) and has a shorter width than both the conductive layer 702 and the conductive layer 740. Portions (e.g., edges) of the conductive layers of the signal conductor 707 at a first side (e.g., the left side, in the view 700) of the signal conductor 707 define a curve 739, which may be an exponential, geometric, or parabolic curve or another applicable type of curve. Portions (e.g., edges) of the conductive layers of the signal conductor 707 at a second side (e.g., the right side, in the view 700) of the signal conductor 707 define a curve 737, which may be an exponential, geometric, or parabolic curve or another applicable type of curve.

The return conductor 703 is a stepped multi-layer structure that includes conductive layers 704, 720, 724, 728, and 732. The return conductor 705 is a stepped multi-layer structure that includes conductive layers 706, 722, 726, 730, and 734. The conductive layers 704, 720, 724, 728, and 732 of the return conductor 703 and the conductive layers 706, 722, 726, 730, and 734 of the return conductor 705 are respectively stepped such that these layers extend closer to a central axis 709 the closer these conductive layers are to the reference plane 718 (in other words, the further these conductive layers are from the upper surface of the coplanar waveguide 701). Portions (e.g., edges) of the conductive layers of the return conductor 703 in combination with a portion (e.g., edge) of the reference plane 718 in the opening 750 define a curve 736, which may be an exponential, geometric, or parabolic curve or another applicable type of curve. Portions (e.g., edges) of the conductive layers of the return conductor 705 in combination with a portion (e.g., edge) of the reference plane 718 in the opening 750 define a curve 738, which may be an exponential, geometric, or parabolic curve or another applicable type of curve. These portions of the conductive layers of the return conductors 703 and 705 may be capacitively coupled with the signal conductor 707.

Figure 8:
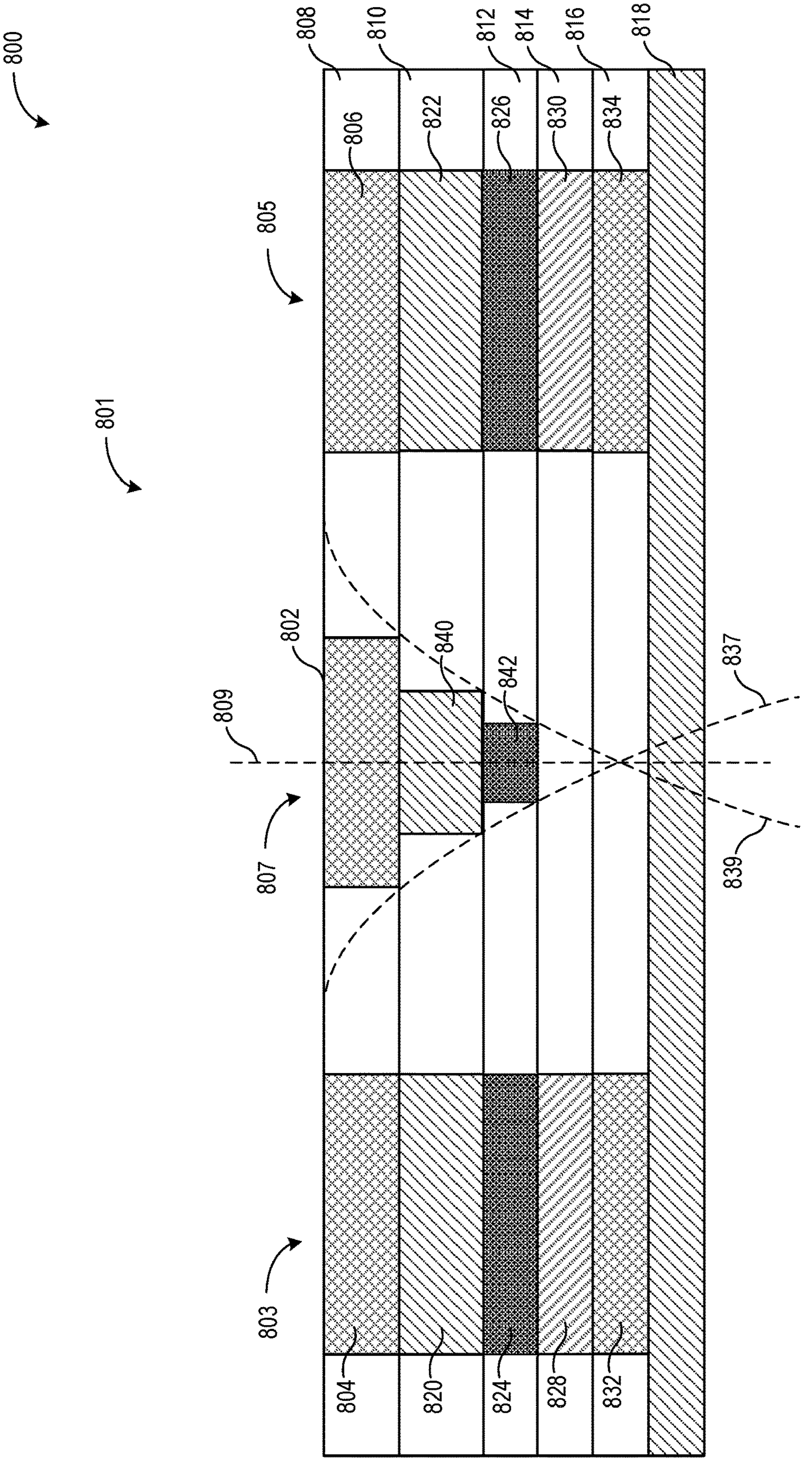
FIG. 8 is a cross-sectional view of a coplanar waveguide having a stepped multi-layer signal conductor and vertically aligned multi-layer return conductors, in accordance with various embodiments.

FIG. 8 is a cross-sectional view 800 of a coplanar waveguide 801 (e.g., the coplanar waveguide 101, 301, FIGS. 1, 3, respectively) having a stepped multi-layer signal conductor 807 and non-stepped (e.g., substantially vertically aligned) multi-layer return conductors 803 and 805. The coplanar waveguide 801 includes dielectric layers 808, 810, 812, 814, and 816 formed over a reference plane 818 and conductive layers 802, 804, 806, 820, 822, 824, 826, 828, 830, 832, 834, 840, and 842 are formed in or on corresponding dielectric layers of the dielectric layers 808, 810, 812, 814, and 816. The conductive layers 802, 804, 806, 820, 822, 824, 826, 828, 830, 832, 834, 840, and 842 and the reference plane 818 may be formed from one or more conductive materials such as gold or copper as non-limiting examples. While adjacent conductive layers of the conductive layers 802, 804, 806, 820, 822, 824, 826, 828, 830, 832, 834, 840, and 842 are shown to be formed directly on one another in the present example, it should be understood that one or more pairs of such adjacent conductive layers may be electrically connected by one or more conductive vias formed in corresponding dielectric layers of the dielectric layers 808, 810, 812, 814, and 816. The dielectric layers 808,

810, 812, 814, and 816 may be formed from one or more dielectric materials such as silicon oxide or aluminum oxide as non-limiting examples.

The signal conductor 807 is a stepped multi-layer structure that includes conductive layers 802, 840, and 842 disposed in or on the dielectric layers 808, 810, and 812, respectively, of the coplanar waveguide 801 between the return conductors 803, 805. The conductive layers 802, 840, and 842 are stepped such that the conductive layers decrease in width the further away these conductive layers are from the upper surface of the coplanar waveguide 801 and the conductive layer 802. For example, the conductive layer 802 is formed in or on the dielectric layer 808 (closest to the upper surface of the coplanar waveguide 801) over the conductive layer 840 and has a greater width than the conductive layer 840. The conductive layer 840 is formed in or on the dielectric layer 810 over the conductive layer 842 and has a greater width than the conductive layer 842. The conductive layer 842 is formed in or on the dielectric layer 812 below the conductive layers 802 and 840 (furthest from the upper surface of the coplanar waveguide 801) and has a shorter width than both the conductive layer 802 and the conductive layer 840. Portions (e.g., edges) of the conductive layers of the signal conductor 807 at a first side (e.g., the left side, in the view 800) of the signal conductor 807 define a curve 837, which may be an exponential, geometric, or parabolic curve or another applicable type of curve. Portions (e.g., edges) of the conductive layers of the signal conductor 807 at a second side (e.g., the right side, in the view 800) of the signal conductor 807 define a curve 839, which may be an exponential, geometric, or parabolic curve or another applicable type of curve.

The return conductor 803 is a non-stepped multi-layer structure that includes conductive layers 804, 820, 824, 828, and 832. The conductive layers 804, 820, 824, 828, and 832 may be substantially vertically aligned, such that the respective distances of the conductive layers 804, 820, 824, 828, and 832 from the central axis 809 of the coplanar waveguide 801 are substantially the same (e.g., within around 10% of the distance of any other conductive layer of the conductive layers 804, 820, 824, 828, and 832. The return conductor 805 is a non-stepped multi-layer structure that includes conductive layers 806, 822, 826, 830, and 834. The conductive layers 806, 822, 826, 830, and 834 may be substantially vertically aligned, such that the respective distances of the conductive layers 806, 822, 826, 830, and 834 from the central axis 809 of the coplanar waveguide 801 are substantially the same (e.g., within around 10% of the distance of any other conductive layer of the conductive layers 806, 822, 826, 830, and 834.

Because the conductive layers of the signal conductor 807 have a stepped arrangement, capacitive, coupling between the signal conductor 807 and each of the conductive layers of the return conductors 803 and 805, is more evenly distributed across the signal conductor 807, resulting in broader current distribution across the surfaces (e.g., both the side and bottom surfaces) of the signal conductor 807 during normal operation of the coplanar waveguide 801. Because the current distribution across the surfaces of the signal conductor 807 is more evenly distributed across a wider area, current crowding and associated skin effect losses in the signal conductor 807 are advantageously reduced. Further, because it includes multiple conductive layers, rather than a single conductive layer, the signal conductor 807 may have comparatively lower ohmic resistance and, therefore, less signal loss.

Figure 9:
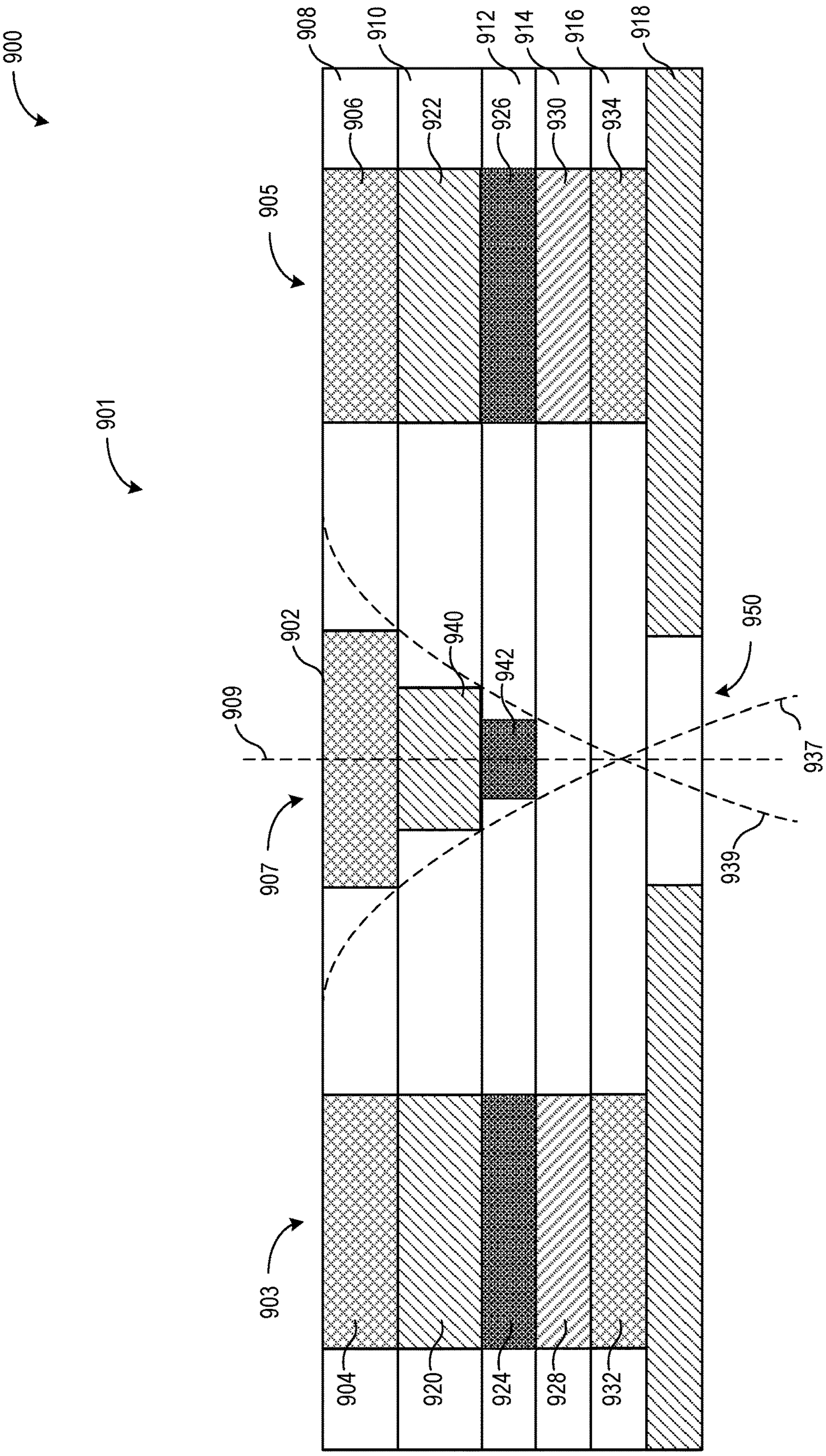
FIG. 9 is a cross-sectional view of a coplanar waveguide overlapping an opening in the reference-plane, the coplanar waveguide having a stepped multi-layer signal conductor and vertically aligned multi-layer return conductors, in accordance with various embodiments.

FIG. 9 is a cross-sectional view 900 of a coplanar waveguide 901 (e.g., the coplanar waveguide 101, 301, FIGS. 1, 2, 3) having a stepped multi-layer signal conductor 907, non-stepped (e.g., substantially vertically aligned) multi-layer return conductors 903 and 905, and a reference plane 918 having an opening 950 (e.g., the opening 204 of FIG. 2). The coplanar waveguide 901 includes dielectric layers 908, 910, 912, 914, and 916 formed over a reference plane 918 and conductive layers 902, 904, 906, 920, 922, 924, 926, 928, 930, 932, 934, 940, and 942 are formed in or on corresponding dielectric layers of the dielectric layers 908, 910, 912, 914, and 916. Some aspects of the return conductors 903, 905, the signal conductor 907, and/or other elements of the coplanar waveguide 901 may be similar to those described above in connection with the coplanar waveguide 801 of FIG. 8 and corresponding details are not repeated here for sake of brevity. In some embodiments, the coplanar waveguide 901 may have periodic openings 950 in the reference plane 918, such that cross-sections of the coplanar waveguide 901 overlapping the periodic openings 950 appear as shown in the present example, while cross-sections of the coplanar waveguide 901 that do not overlap the periodic openings 950 appear as shown in the example of FIG. 8 (i.e., where the reference plane 818 does not include an opening along the cross-section).

The signal conductor 907 is a stepped multi-layer structure that includes conductive layers 902, 940, and 942 disposed in or on the dielectric layers 908, 910, and 912, respectively, of the coplanar waveguide 901 between the return conductors 903, 905. The conductive layers 902, 940, and 942 are stepped such that the conductive layers decrease in width the further away these conductive layers are from the upper surface of the coplanar waveguide 901 and the conductive layer 902. For example, the conductive layer 902 is formed in or on the dielectric layer 908 (closest to the upper surface of the coplanar waveguide 901) over the conductive layer 940 and has a greater width than the conductive layer 940. The conductive layer 940 is formed in or on the dielectric layer 910 over the conductive layer 942 and has a greater width than the conductive layer 942. The conductive layer 942 is formed in or on the dielectric layer 912 below the conductive layers 902 and 940 (furthest from the upper surface of the coplanar waveguide 901) and has a shorter width than both the conductive layer 902 and the conductive layer 940. Portions (e.g., edges) of the conductive layers of the signal conductor 907 at a first side (e.g., the left side, in the view 900) of the signal conductor 907 define a curve 939, which may be an exponential, geometric, or parabolic curve or another applicable type of curve. Portions (e.g., edges) of the conductive layers of the signal conductor 907 at a second side (e.g., the right side, in the view 900) of the signal conductor 907 define a curve 937, which may be an exponential, geometric, or parabolic curve or another applicable type of curve.

The return conductor 903 is a non-stepped multi-layer structure that includes conductive layers 904, 920, 924, 928, and 932. The conductive layers 904, 920, 924, 928, and 932 may be substantially vertically aligned, such that the respective distances of the conductive layers 904, 920, 924, 928, and 932 from the central axis 909 of the coplanar waveguide 901 are substantially the same (e.g., within around 10% of the distance of any other conductive layer of the conductive layers 904, 920, 924, 928, and 932. The return conductor 905 is a non-stepped multi-layer structure that includes conductive layers 906, 922, 926, 930, and 934. The conductive layers 906, 922, 926, 930, and 934 may be substantially vertically aligned, such that the respective distances of the conductive layers 906, 922, 926, 930, and 934 from the central axis 909 of the coplanar waveguide 901 are substantially the same (e.g., within around 10% of the distance of any other conductive layer of the conductive layers 906, 922, 926, 930, and 934. While the opening 950 is shown to be narrower than the gaps between corresponding conductive layers of the return conductors 903 and 905 (e.g., those layers formed in or on a common dielectric layer, such as the conductive layers 904 and 906 each formed in or on the dielectric layer 908) in the present example, it should be noted that in one or more other embodiments the opening 950 may be similar in width or wider than the gaps between corresponding conductive layers of the return conductors 903 and 905.

Figure 10:
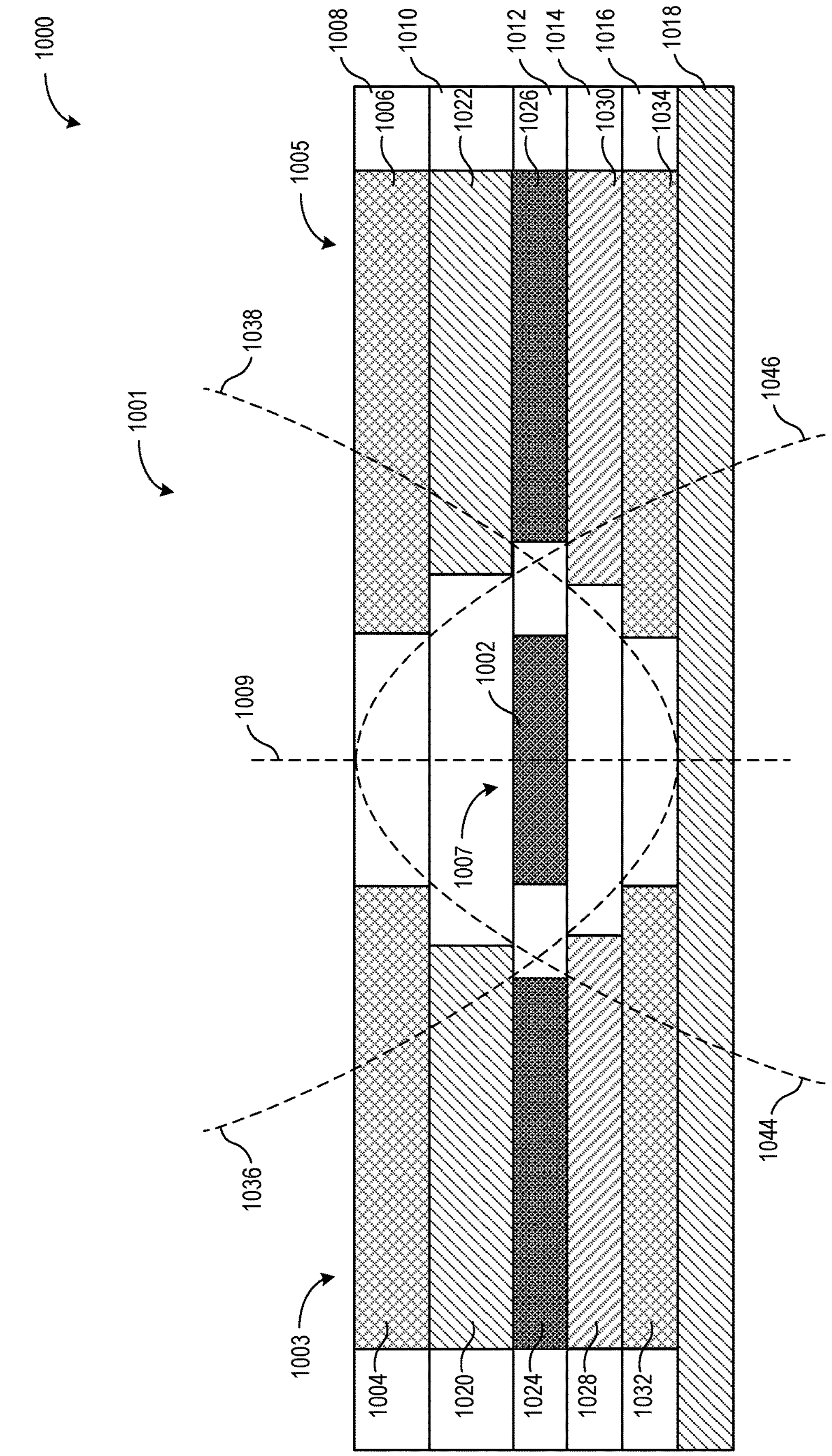
FIG. 10 is a cross-sectional view of a coplanar waveguide having an embedded single-layer signal conductor and stepped multi-layer return conductors, in accordance with various embodiments.

FIG. 10 is a cross-sectional view 1000 of a coplanar waveguide 1001 (e.g., the coplanar waveguide 101, 301, FIGS. 1, 3, respectively) having an embedded single-layer signal conductor 1007 and stepped multi-layer return conductors 1003 and 1005. The coplanar waveguide 1001 includes dielectric layers 1008, 1010, 1012, 1014, and 1016 formed over a reference plane 1018 and conductive layers 1002, 1004, 1006, 1020, 1022, 1024, 1026, 1028, 1030, 1032, and 1034 are formed in or on corresponding dielectric layers of the dielectric layers 1008, 1010, 1012, 1014, and 1016. The conductive layers 1002, 1004, 1006, 1020, 1022, 1024, 1026, 1028, 1030, 1032, and 1034 and the reference plane 1018 may be formed from one or more conductive materials such as gold or copper as non-limiting examples. While adjacent conductive layers of the conductive layers 1002, 1004, 1006, 1020, 1022, 1024, 1026, 1028, 1030, 1032, and 1034 are shown to be formed directly on one another in the present example, it should be understood that one or more pairs of such adjacent conductive layers may be electrically connected by one or more conductive vias formed in corresponding dielectric layers of the dielectric layers 1008, 1010, 1012, 1014, and 1016. The dielectric layers 1008, 1010, 1012, 1014, and 1016 may be formed from one or more dielectric materials such as silicon oxide or aluminum oxide as non-limiting examples.

The signal conductor 1007 includes a single conductive layer 1002 disposed in or on an intermediate dielectric layer (e.g., the dielectric layer 1012 in the present example) of the coplanar waveguide 1001 between the return conductors 1003, 1005. In some embodiments, the conductive layer 1002 may be formed concurrently with the conductive layers 1024 and 1026. The return conductor 1003 is a stepped multi-layer structure that includes conductive layers 1004, 1020, 1024, 1028, and 1032. The return conductor 1005 is a stepped multi-layer structure that includes conductive layers 1006, 1022, 1026, 1030, and 1034.

Both the conductive layers 1004, 1020, 1024, 1028, and 1032 of the return conductor 1003 and the conductive layers 1006, 1022, 1026, 1030, and 1034 of the return conductor 1005 respectively include sets of stepped conductive layers. For example, the return conductor 1003 may include a first set of conductive layers that includes the conductive layers 1024, 1028, and 1032, which are stepped such that these conductive layers extend closer to a central axis 1009 the closer these conductive layers are to the reference plane 1018 (in other words, the further these conductive layers are from the upper surface of the coplanar waveguide 1001). The return conductor 1003 may include a second set of conductive layers that includes the conductive layers 1004, 1020, and 1024, which are stepped such that these conductive layers extend closer to the central axis 1009 the closer these conductive layers are to the upper surface of the coplanar waveguide 1001 (in other words, the further these conductive layers are from the reference plane 1018). Portions (e.g., edges) of the first set of conductive layers of the return conductor 1003 define a curve 1036, which may be an exponential, geometric, or parabolic curve or another applicable type of curve. Portions (e.g., edges) of the second set of conductive layers of the return conductor 1003 define a curve 1044, which may be an exponential, geometric, or parabolic curve or another applicable type of curve. These portions of the conductive layers of the return conductor 1003 may be capacitively coupled with the signal conductor 1007.

For example, the return conductor 1005 may include a third set of conductive layers that includes the conductive layers 1026, 1030, and 1034, which are stepped such that these conductive layers extend closer to a central axis 1009 the closer these conductive layers are to the reference plane 1018 (in other words, the further these conductive layers are from the upper surface of the coplanar waveguide 1001). The return conductor 1005 may include a fourth set of conductive layers that includes the conductive layers 1006, 1022, and 1026, which are stepped such that these conductive layers extend closer to the central axis 1009 the closer these conductive layers are to the upper surface of the coplanar waveguide 1001 (in other words, the further these conductive layers are from the reference plane 1018). Portions (e.g., edges) of the third set of conductive layers of the return conductor 1005 define a curve 1038, which may be an exponential, geometric, or parabolic curve or another applicable type of curve. Portions (e.g., edges) of the fourth set of conductive layers of the return conductor 1005 define a curve 1046, which may be an exponential, geometric, or parabolic curve or another applicable type of curve. These portions of the conductive layers of the return conductor 1005 may be capacitively coupled with the signal conductor 1007.

Because the return conductors 1003 and 1005 each include two sets of stepped conductive layers each defining a respective curve of the curves 1036, 1038, 1044, and 1046, capacitive coupling between the signal conductor 1007 and each of the conductive layers of the return conductors 1003 and 1005, is more evenly distributed across the signal conductor 1007, resulting in broader current distribution across the surfaces (e.g., side, bottom, and top surfaces) of the signal conductor 1007 during normal operation of the coplanar waveguide 1001. Because the current distribution across the surfaces of the signal conductor 1007 is more evenly distributed across a wider area, current crowding and associated skin effect losses in the signal conductor 1007 are advantageously reduced.

In some embodiments, the conductive layers of the return conductors 1003 and 1005 and the signal conductor 1007 may be arranged such that magnitudes of capacitive couplings between the signal conductor 1007 and of the conductive layers of the return conductors 1003 and 1005 are all substantially equal (e.g., within around 10%). For example, the respective distances between the signal conductor 1007 and each of the conductive layers of the return conductors 1003 and 1005 may be substantially equal (e.g., within around 10%) in one or more such embodiments.

Figure 11:
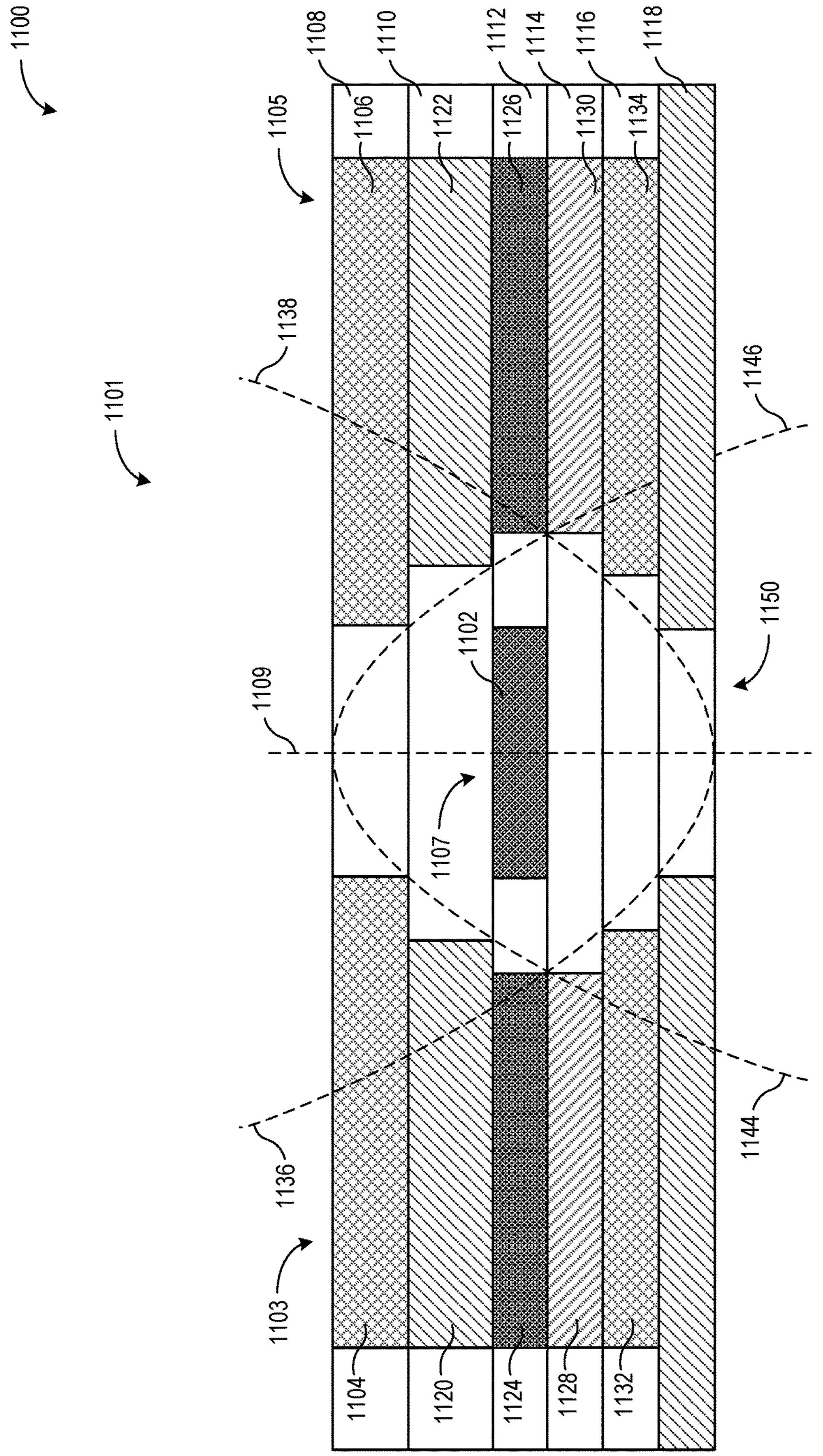
FIG. 11 is a cross-sectional view of a coplanar waveguide overlapping an opening in the reference-plane, the coplanar waveguide having an embedded single-layer signal conductor and stepped multi-layer return conductors, in accordance with various embodiments.

FIG. 11 is a cross-sectional view 1100 of a coplanar waveguide 1101 (e.g., the coplanar waveguide 101, 301, FIGS. 1, 2, 3) having an embedded single-layer signal conductor 1107, stepped multi-layer return conductors 1103 and 1105, and a reference plane 1118 having an opening 1150 (e.g., the opening 204 of FIG. 2). The coplanar waveguide 1101 includes dielectric layers 1108, 1110, 1112, 1114, and 1116 formed over a reference plane 1118 and conductive layers 1102, 1104, 1106, 1120, 1122, 1124, 1126, 1128, 1130, 1132, and 1134 are formed in or on corresponding dielectric layers of the dielectric layers 1108, 1110, 1112, 1114, and 1116. Some aspects of the return conductors 1103, 1105, the signal conductor 1107, and/or other elements of the coplanar waveguide 1101 may be similar to those described above in connection with the coplanar waveguide 1001 of FIG. 10, and corresponding details are not repeated here for sake of brevity. In some embodiments, the coplanar waveguide 1101 may have periodic openings 1150 in the reference plane 1118, such that cross-sections of the coplanar waveguide 1101 overlapping the periodic openings 1150 appear as shown in the present example, while cross-sections of the coplanar waveguide 1101 that do not overlap the periodic openings 1150 appear as shown in the example of FIG. 10 (i.e., where the reference plane 1018 does not include an opening along the cross-section).

The signal conductor 1107 includes a single conductive layer 1102 disposed in or on an intermediate dielectric layer (e.g., the dielectric layer 1112 in the present example) of the coplanar waveguide 1101 between the return conductors 1103, 1105. The return conductor 1103 is a stepped multi-layer structure that includes conductive layers 1104, 1120, 1124, 1128, and 1132. The return conductor 1105 is a stepped multi-layer structure that includes conductive layers 1106, 1122, 1126, 1130, and 1134.

Both the conductive layers 1104, 1120, 1124, 1128, and 1132 of the return conductor 1103 and the conductive layers 1106, 1122, 1126, 1130, and 1134 of the return conductor 1105 respectively include sets of stepped conductive layers. For example, the return conductor 1103 may include a first set of conductive layers that includes the conductive layers 1128, and 1132, which are stepped in combination with a first portion of the reference plane 118 such that these conductive layers and the first portion of the reference plane 1118 extend closer to a central axis 1109 the closer these layers are to a bottom surface (e.g., at which the reference plane 1118 is disposed) of the coplanar waveguide 1101 (in other words, the further these layers are from the upper surface of the coplanar waveguide 1101). The return conductor 1103 may include a second set of conductive layers that includes the conductive layers 1104, 1120, and 1124, which are stepped such that these conductive layers extend closer to the central axis 1109 the closer these conductive layers are to the upper surface of the coplanar waveguide 1101 (in other words, the further these conductive layers are from the reference plane 1118). Portions (e.g., edges) of the first set of conductive layers of the return conductor 1103 in combination with the first portion of the reference plane 1118 define a curve 1136, which may be an exponential, geometric, or parabolic curve or another applicable type of curve. Portions (e.g., edges) of the second set of conductive layers of the return conductor 1103 define a curve 1144, which may be an exponential, geometric, or parabolic curve or another applicable type of curve. These portions of the conductive layers of the return conductor 1103 may be capacitively coupled with the signal conductor 1107.

For example, the return conductor 1105 may include a third set of conductive layers that includes the conductive layers 1130 and 1134, which are stepped in combination with a second portion of the reference plane 118 such that these conductive layers and the second portion of the reference plane 1118 extend closer to a central axis 1109 the closer these conductive layers are to a bottom surface (e.g., at which the reference plane 1118 is disposed) of the coplanar waveguide 1101 (in other words, the further these conductive layers are from the upper surface of the coplanar waveguide 1101). The return conductor 1105 may include a fourth set of conductive layers that includes the conductive layers 1106, 1122, and 1126, which are stepped such that these conductive layers extend closer to the central axis 1109 the closer these conductive layers are to the upper surface of the coplanar waveguide 1101 (in other words, the further these conductive layers are from the reference plane 1118). Portions (e.g., edges) of the third set of conductive layers of the return conductor 1105 in combination with the second portion of the reference plane 1118 define a curve 1138, which may be an exponential, geometric, or parabolic curve or another applicable type of curve. Portions (e.g., edges) of the fourth set of conductive layers of the return conductor 1105 define a curve 1146, which may be an exponential, geometric, or parabolic curve or another applicable type of curve. These portions of the conductive layers of the return conductor 1105 may be capacitively coupled with the signal conductor 1107.

In some embodiments, the conductive layers of the return conductors 1103 and 1105 and the signal conductor 1107 may be arranged such that magnitudes of capacitive couplings between the signal conductor 1107 and of the conductive layers of the return conductors 1103 and 1105 are all substantially equal (e.g., within around 10%). For example, the respective distances between the signal conductor 1107 and each of the conductive layers of the return conductors 1103 and 1105 may be substantially equal (e.g., within around 10%) in one or more such embodiments.

Figure 12:
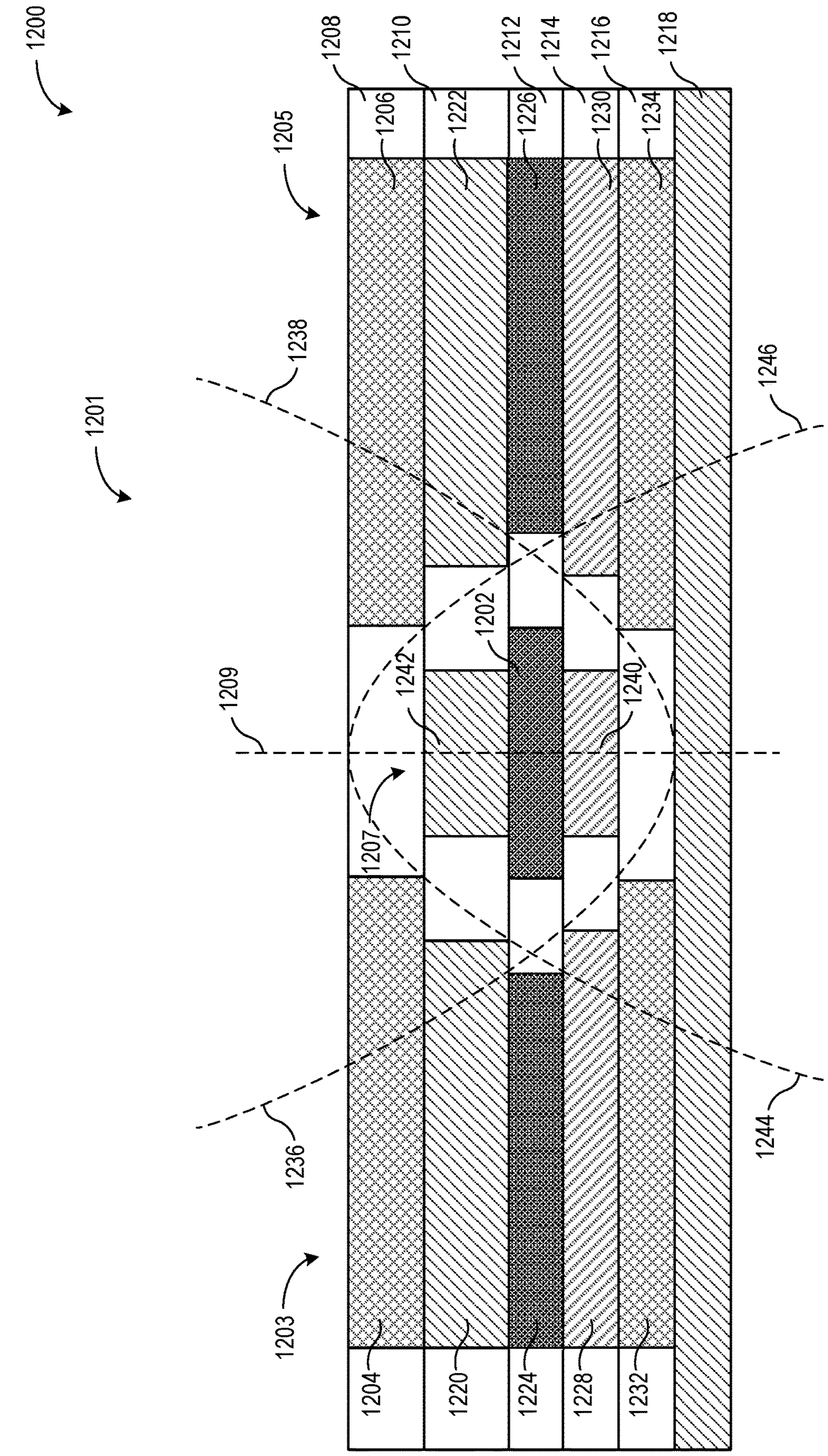
FIG. 12 is a cross-sectional view of a coplanar waveguide having an embedded stepped multi-layer signal conductor and stepped multi-layer return conductors, in accordance with various embodiments.

FIG. 12 is a cross-sectional view 1200 of a coplanar waveguide 1201 (e.g., the coplanar waveguide 101, 301, FIGS. 1, 3, respectively) having an embedded stepped multi-layer signal conductor 1207 and stepped multi-layer return conductors 1203 and 1205. The coplanar waveguide 1201 includes dielectric layers 1208, 1210, 1212, 1214, and 1216 formed over a reference plane 1218 and conductive layers 1202, 1204, 1206, 1220, 1222, 1224, 1226, 1228, 1230, 1232, 1234, 1240, and 1242 are formed in or on corresponding dielectric layers of the dielectric layers 1208, 1210, 1212, 1214, and 1216. The conductive layers 1202, 1204, 1206, 1220, 1222, 1224, 1226, 1228, 1230, 1232, 1234, 1240, and 1242 and the reference plane 1218 may be formed from one or more conductive materials such as gold or copper as non-limiting examples. While adjacent conductive layers of the conductive layers 1202, 1204, 1206, 1220, 1222, 1224, 1226, 1228, 1230, 1232, 1234, 1240, and 1242 are shown to be formed directly on one another in the present example, it should be understood that one or more pairs of such adjacent conductive layers may be electrically connected by one or more conductive vias formed in corresponding dielectric layers of the dielectric layers 1208, 1210, 1212, 1214, and 1216. The dielectric layers 1208, 1210, 1212, 1214, and 1216 may be formed from one or more dielectric materials such as silicon oxide or aluminum oxide as non-limiting examples.

The signal conductor 1207 is a stepped multi-layer structure that includes conductive layers 1202, 1240, and 1242 disposed in or on intermediate dielectric layers (e.g., the dielectric layers 1210, 1212, and 1214 in the present example) of the coplanar waveguide 1201 between the return conductors 1203, 1205. The conductive layers 1202, 1240, and 1242 are stepped such that the conductive layers decrease in width the further away these conductive layers are from a middle conductive layer (e.g., the conductive layer 1202) of the signal conductor 1207. For example, the conductive layer 1202 is formed in or on the dielectric layer 1212 and is the widest conductive layer of the signal conductor 1207. The conductive layer 1240 is disposed below the conductive layer 1202 and is less wide than the conductive layer 1202. The conductive layer 1240 is formed in or on the dielectric layer 1214. The conductive layer 1242 is formed in or on the dielectric layer 1212 over the conductive layer 1202 and is less wide than the conductive layer 1202. In some embodiments, the conductive layers 1240 and 1242 have the same or substantially similar widths.

Both the conductive layers 1204, 1220, 1224, 1228, and 1232 of the return conductor 1203 and the conductive layers 1206, 1222, 1226, 1230, and 1234 of the return conductor 1205 respectively include sets of stepped conductive layers. For example, the return conductor 1203 may include a first set of conductive layers that includes the conductive layers 1224, 1228, and 1232, which are stepped such that these conductive layers extend closer to a central axis 1209 the closer these conductive layers are to the reference plane 1218 (in other words, the further these conductive layers are from the upper surface of the coplanar waveguide 1201). The return conductor 1203 may include a second set of conductive layers that includes the conductive layers 1204, 1220, and 1224, which are stepped such that these conductive layers extend closer to the central axis 1209 the closer these conductive layers are to the upper surface of the coplanar waveguide 1201 (in other words, the further these conductive layers are from the reference plane 1218). Portions (e.g., edges) of the first set of conductive layers of the return conductor 1203 define a curve 1236, which may be an exponential, geometric, or parabolic curve or another applicable type of curve. Portions (e.g., edges) of the second set of conductive layers of the return conductor 1203 define a curve 1244, which may be an exponential, geometric, or parabolic curve or another applicable type of curve. These portions of the conductive layers of the return conductor 1205 may be capacitively coupled with the signal conductor 1207.

For example, the return conductor 1205 may include a third set of conductive layers that includes the conductive layers 1226, 1230, and 1234, which are stepped such that these conductive layers extend closer to a central axis 1209 the closer these conductive layers are to the reference plane 1218 (in other words, the further these conductive layers are from the upper surface of the coplanar waveguide 1201). The return conductor 1205 may include a fourth set of conductive layers that includes the conductive layers 1206, 1222, and 1226, which are stepped such that these conductive layers extend closer to the central axis 1209 the closer these conductive layers are to the upper surface of the coplanar waveguide 1201 (in other words, the further these conductive layers are from the reference plane 1218). Portions (e.g., edges) of the third set of conductive layers of the return conductor 1205 define a curve 1238, which may be an exponential, geometric, or parabolic curve or another applicable type of curve. Portions (e.g., edges) of the fourth set of conductive layers of the return conductor 1205 define a curve 1246, which may be an exponential, geometric, or parabolic curve or another applicable type of curve. These portions of the conductive layers of the return conductor 1205 may be capacitively coupled with the signal conductor 1207.

Because the return conductors 1203 and 1205 each include two sets of stepped conductive layers each defining a respective curve of the curves 1236, 1238, 1244, and 1246 and the signal conductor 1207 includes stepped conductive layers embedded in intermediate dielectric layers of the coplanar waveguide 1201, capacitive coupling between the signal conductor 1207 and each of the conductive layers of the return conductors 1203 and 1205, is more evenly distributed across the signal conductor 1207, resulting in broader current distribution across the surfaces (e.g., side, bottom, and top surfaces) of the signal conductor 1207 during normal operation of the coplanar waveguide 1201. Because the current distribution across the surfaces of the signal conductor 1207 is more evenly distributed across a wider area, current crowding and associated skin effect losses in the signal conductor 1207 are advantageously reduced. Further, because it includes multiple conductive layers, rather than a single conductive layer, the signal conductor 1207 may have comparatively lower ohmic resistance and, therefore, less signal loss.

In some embodiments, the conductive layers of the return conductors 1203 and 1205 and the conductive layers of the signal conductor 1207 may be arranged such that magnitudes of capacitive couplings between the signal conductor 1207 and of the conductive layers of the return conductors 1203 and 1205 are all substantially equal (e.g., within around 10%). For example, the respective distances between the signal conductor 1207 and each of the conductive layers of the return conductors 1203 and 1205 may be substantially equal (e.g., within around 10%) in one or more such embodiments.

Figure 13:
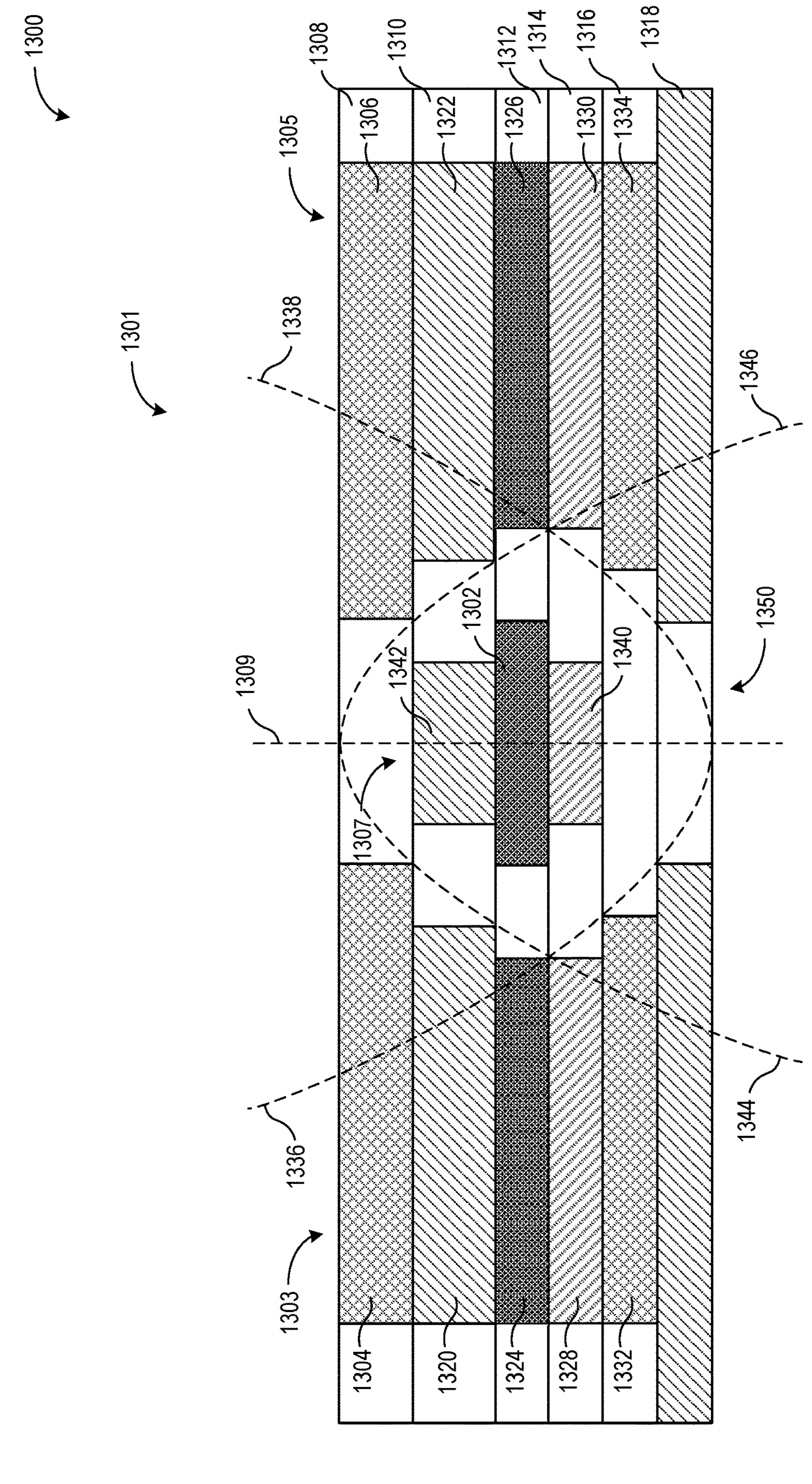
FIG. 13 is a cross-sectional view of a coplanar waveguide overlapping an opening in the reference-plane, the coplanar waveguide having an embedded stepped multi-layer signal conductor and stepped multi-layer return conductors, in accordance with various embodiments.

FIG. 13 is a cross-sectional view 1300 of a coplanar waveguide 1301 (e.g., the coplanar waveguide 101, 301, FIGS. 1, 3, respectively) having an embedded multi-layer signal conductor 1307, stepped multi-layer return conductors 1303 and 1305, and a reference plane 1318 having an opening 1350 (e.g., the opening 204 of FIG. 2). The coplanar waveguide 1301 includes dielectric layers 1308, 1310, 1312, 1314, and 1316 formed over a reference plane 1318 and conductive layers 1302, 1304, 1306, 1320, 1322, 1324, 1326, 1328, 1330, 1332, 1334, 1340, and 1342 are formed in or on corresponding dielectric layers of the dielectric layers 1308, 1310, 1312, 1314, and 1316. Some aspects of the return conductors 1303, 1305, the signal conductor 1307, and/or other elements of the coplanar waveguide 1301 may be similar to those described above in connection with the coplanar waveguide 1201 of FIG. 12, and corresponding details are not repeated here for sake of brevity. In some embodiments, the coplanar waveguide 1301 may have periodic openings 1350 in the reference plane 1318, such that cross-sections of the coplanar waveguide 1301 overlapping the periodic openings 1350 appear as shown in the present example, while cross-sections of the coplanar waveguide 1301 that do not overlap the periodic openings 1350 appear as shown in the example of FIG. 12 (i.e., where the reference plane 1218 does not include an opening along the cross-section).

The signal conductor 1307 includes a stepped multi-layer structure that includes conductive layers 1302, 1340, and 1342 disposed in or on intermediate dielectric layers (e.g., the dielectric layers 1310, 1312, and 1314 in the present example) of the coplanar waveguide 1301 between the return conductors 1303, 1305. For example, the conductive layer 1302 is formed in or on the dielectric layer 1312 and is the widest conductive layer of the signal conductor 1307. The conductive layer 1340 is disposed below the conductive layer 1302 and is less wide than the conductive layer 1302. The conductive layer 1340 is formed in or on the dielectric layer 1314. The conductive layer 1342 is formed in or on the dielectric layer 1312 over the conductive layer 1302 and is less wide than the conductive layer 1302. In some embodiments, the conductive layers 1340 and 1342 have the same or substantially similar widths.

The return conductor 1303 is a stepped multi-layer structure that includes conductive layers 1304, 1320, 1324, 1328, and 1332. The return conductor 1305 is a stepped multilayer structure that includes conductive layers 1306, 1322, 1326, 1330, and 1334.

Both the conductive layers 1304, 1320, 1324, 1328, and 1332 of the return conductor 1303 and the conductive layers 1306, 1322, 1326, 1330, and 1334 of the return conductor 1305 respectively include sets of stepped conductive layers. For example, the return conductor 1303 may include a first set of conductive layers that includes the conductive layers 1328, and 1332, which are stepped in combination with a first portion of the reference plane 1318 such that these conductive layers and the first portion of the reference plane 1318 extend closer to a central axis 1309 the closer these conductive layers are to a bottom surface (e.g., at which the reference plane 1318 is disposed) of the coplanar waveguide 1301 (in other words, the further these conductive layers are from the upper surface of the coplanar waveguide 1301). The return conductor 1303 may include a second set of conductive layers that includes the conductive layers 1304, 1320, and 1324, which are stepped such that these conductive layers extend closer to the central axis 1309 the closer these conductive layers are to the upper surface of the coplanar waveguide 1301 (in other words, the further these conductive layers are from the reference plane 1318). Portions (e.g., edges) of the first set of conductive layers of the return conductor 1303 in combination with the first portion of the reference plane 1318 define a curve 1336, which may be an exponential, geometric, or parabolic curve or another applicable type of curve. Portions (e.g., edges) of the second set of conductive layers of the return conductor 1303 define a curve 1344, which may be an exponential, geometric, or parabolic curve or another applicable type of curve. These portions of the conductive layers of the return conductor 1303 may be capacitively coupled with the signal conductor 1307.

For example, the return conductor 1305 may include a third set of conductive layers that includes the conductive layers 1330 and 1334, which are stepped in combination with a second portion of the reference plane 1318 such that these conductive layers and the second portion of the reference plane 1318 extend closer to a central axis 1309 the closer these conductive layers are to a bottom surface (e.g., at which the reference plane 1318 is disposed) of the coplanar waveguide 1301 (in other words, the further these conductive layers are from the upper surface of the coplanar waveguide 1301). The return conductor 1305 may include a fourth set of conductive layers that includes the conductive layers 1306, 1322, and 1326, which are stepped such that these conductive layers extend closer to the central axis 1309 the closer these conductive layers are to the upper surface of the coplanar waveguide 1301 (in other words, the further these conductive layers are from the reference plane 1318). Portions (e.g., edges) of the third set of conductive layers of the return conductor 1305 in combination with the second portion of the reference plane 1318 define a curve 1338, which may be an exponential, geometric, or parabolic curve or another applicable type of curve. Portions (e.g., edges) of the fourth set of conductive layers of the return conductor 1305 define a curve 1346, which may be an exponential, geometric, or parabolic curve or another applicable type of curve. These portions of the conductive layers of the return conductor 1305 may be capacitively coupled with the signal conductor 1307.

In some embodiments, the conductive layers of the return conductors 1303 and 1305 and the conductive layers of the signal conductor 1307 may be arranged such that magnitudes of capacitive couplings between the signal conductor 1307 and of the conductive layers of the return conductors 1303 and 1305 are all substantially equal (e.g., within around 10%). For example, the respective distances between the signal conductor 1307 and each of the conductive layers of the return conductors 1303 and 1305 may be substantially equal (e.g., within around 10%) in one or more such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A waveguide comprising:

a first return conductor comprising a first plurality of conductive layers having a first stepped arrangement that defines a first curve;

a second return conductor comprising a second plurality of conductive layers having a second stepped arrangement that defines a second curve; and a signal conductor disposed between the first return conductor and the second return conductor, wherein the signal conductor comprises a third plurality of conductive layers having a third stepped arrangement that defines a third curve and a fourth curve.

2. The waveguide of claim 1, further comprising:

a reference plane coupled to the first return conductor and the second return conductor, wherein the reference plane includes periodic openings that are overlapped by the signal conductor.

3. The waveguide of claim 1, wherein the first curve and the second curve are each selected from the group consisting of: an exponential curve, a geometric curve, and a parabolic curve.

4. The waveguide of claim 1, wherein at least one conductive layer of the third plurality of conductive layers of the signal conductor is disposed at an upper surface of the waveguide.

5. The waveguide of claim 1, wherein the third curve and the second curve are each selected from the group consisting of: an exponential curve, a geometric curve, and a parabolic curve.

6. A transmission line comprising:

a first return conductor comprising a first plurality of stepped conductive layers defining a first curve;

a second return conductor comprising a second plurality of stepped conductive layers defining a second curve, wherein the first curve and the second curve are selected from the group consisting of: an exponential curve, a geometric curve, and a parabolic curve; and a signal conductor disposed between the first return conductor and the second return conductor, wherein the signal conductor is disposed in at least one intermediate dielectric layer of the transmission line.

7. The transmission line of claim 6, wherein the signal conductor further includes at least one conductive layer disposed at an upper surface of the transmission line.

8. The transmission line of claim 7, wherein each conductive layer of the first plurality of stepped conductive layers and the second plurality of stepped conductive layers extends closer to a central axis of the transmission line with increasing proximity to a reference plane of the coplanar waveguide.

9. The transmission line of claim 7, wherein the signal conductor further includes a third plurality of stepped conductive layers including a first conductive layer, wherein the conductive layers of the third plurality of stepped conductive layers have decreasing width with increasing distance from the first conductive layer.

10. A coplanar waveguide comprising:

a first return conductor comprising a first plurality of stepped conductive layers;

a second return conductor comprising a second plurality of stepped conductive layers;

a reference plane coupled to the first return conductor and the second return conductor; and a signal conductor disposed between the first return conductor and the second return conductor, wherein the first plurality of stepped conductive layers of the first return conductor comprises a first set of stepped conductive lavers having first edges that define a first curve and a second set of stepped conductive layers having second edges that define a second curve, wherein the second plurality of stepped conductive layers of the second return conductor comprises a third set of stepped conductive layers having third edges that define a third curve and a fourth set of stepped conductive layers having fourth edges that define a fourth curve, and wherein the first edges, the second edges, the third edges, and the fourth edges are capacitively coupled with the signal conductor.

11. The coplanar waveguide of claim 10, wherein each conductive layer of the first plurality of stepped conductive layers and the second plurality of stepped conductive layers extends closer to a central axis of the coplanar waveguide with increasing proximity to the reference plane.

12. The coplanar waveguide of claim 10, wherein the signal conductor is disposed in at least one intermediate dielectric layer of the coplanar waveguide.

13. The coplanar waveguide of claim 10, wherein the signal conductor includes at least one conductive layer disposed at an upper surface of the coplanar waveguide.

14. The coplanar waveguide of claim 10, wherein the signal conductor includes a third plurality of stepped conductive layers.

* * * * *